United States Patent
Keeling et al.

(10) Patent No.: US 9,608,465 B2
(45) Date of Patent: Mar. 28, 2017

(54) DEVICES, SYSTEMS, AND METHOD FOR POWER CONTROL OF DYNAMIC ELECTRIC VEHICLE CHARGING SYSTEMS

(71) Applicant: QUALCOMM Incorporated, San Diego, CA (US)

(72) Inventors: Nicholas Athol Keeling, Auckland (NZ); Claudio Armando Camasca Ramirez, Auckland (NZ); Jonathan Beaver, Auckland (NZ); Chang-Yu Huang, Auckland (NZ); Mickel Bipin Budhia, Auckland (NZ); Michael Le Gallais Kissin, Auckland (NZ)

(73) Assignee: QUALCOMM Incorporated, San Diego, CA (US)

( * ) Notice: Subject to any disclaimer, the term of this patent is extended or adjusted under 35 U.S.C. 154(b) by 250 days.

(21) Appl. No.: 14/472,856

(22) Filed: Aug. 29, 2014

(65) Prior Publication Data
US 2015/0303714 A1   Oct. 22, 2015

Related U.S. Application Data

(60) Provisional application No. 61/981,630, filed on Apr. 18, 2014.

(51) Int. Cl.
*H02J 7/00* (2006.01)
*B60L 11/18* (2006.01)
(Continued)

(52) U.S. Cl.
CPC ............ *H02J 7/007* (2013.01); *B60L 11/182* (2013.01); *B60L 11/1809* (2013.01); *B60L 11/1838* (2013.01); *H02J 5/005* (2013.01); *H02J 7/0052* (2013.01); *H02J 7/025* (2013.01); *H02J 17/00* (2013.01); *Y02T 10/7005* (2013.01); *Y02T 10/7072* (2013.01); *Y02T 90/122* (2013.01); *Y02T 90/14* (2013.01)

(58) Field of Classification Search
CPC ........................................................ H02J 7/007
USPC ........................................................ 320/108
See application file for complete search history.

(56) References Cited

U.S. PATENT DOCUMENTS

| | | |
|---|---|---|
| 2013/0063085 A1 | 3/2013 | Takada et al. |
| 2013/0099588 A1 | 4/2013 | Yeo et al. |

(Continued)

FOREIGN PATENT DOCUMENTS

| | | |
|---|---|---|
| EP | 2717429 A1 | 4/2014 |
| WO | WO-2013084492 A1 | 6/2013 |
| WO | WO-2013090565 A1 | 6/2013 |

OTHER PUBLICATIONS

International Search Report and Written Opinion—PCT/US2015/019953—ISA/EPO—Jun. 17, 2015.

*Primary Examiner* — Richard V Muralidar
(74) *Attorney, Agent, or Firm* — Knobbe, Martens, Olson & Bear, LLP

(57) ABSTRACT

Systems, methods, and apparatus are disclosed for wirelessly charging an electric vehicle. In one aspect, a method of wirelessly charging an electric vehicle is provided. The method includes, obtaining a request from the electric vehicle for a level of charging power to be delivered from a power transmitter to the electric vehicle via a charging field. The method further includes controlling a current or voltage of the power transmitter based on a power efficiency factor and the requested level of charging power.

29 Claims, 13 Drawing Sheets

(51) Int. Cl.
  *H02J 17/00*  (2006.01)
  *H02J 5/00*   (2016.01)
  *H02J 7/02*   (2016.01)

(56) References Cited

U.S. PATENT DOCUMENTS

2013/0214735 A1     8/2013   Kang et al.
2014/0062395 A1     3/2014   Kwon et al.
2014/0084858 A1*    3/2014   Kim .................. H02J 7/025
                                                    320/108
2014/0371966 A1*    12/2014  Ohashi ............... B60L 11/1831
                                                    701/22

* cited by examiner

# DEVICES, SYSTEMS, AND METHOD FOR POWER CONTROL OF DYNAMIC ELECTRIC VEHICLE CHARGING SYSTEMS

CROSS REFERENCE TO RELATED APPLICATIONS

This application claims priority under 35 U.S.C. §119(e) to U.S. Provisional Patent Application No. 61/981,630 entitled "DEVICES, SYSTEMS, AND METHOD FOR POWER CONTROL OF DYNAMIC ELECTRIC VEHICLE CHARGING SYSTEMS" filed on Apr. 18, 2014 the disclosure of which is hereby incorporated by reference in its entirety.

FIELD

This application is generally related to wireless power charging of chargeable devices such as electric vehicles.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless charging systems that are capable of transferring power in free space (e.g., via a wireless field) to be used to charge the electric vehicle to overcome some of the deficiencies of wired charging solutions.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the subject matter described in the disclosure provides an apparatus for wirelessly charging an electric vehicle. The apparatus includes a communication receiver configured to obtain a request for a level of charging power to be delivered from a power antenna circuit to the vehicle via a charging field. The apparatus further includes a controller operationally coupled to the communication receiver. The controller configured control a current or voltage generator of the power antenna circuit based on a power efficiency factor and the requested level of charging power.

Another aspect of the subject matter described in the disclosure provides a method for wirelessly charging an electric vehicle. The method includes obtaining a request from the electric vehicle for a level of charging power to be delivered from a power transmitter to the electric vehicle via a charging field. The method further includes controlling a current or voltage of the power transmitter based on a power efficiency factor and the requested level of charging power.

Another aspect of the subject matter described in the disclosure provides an apparatus for wirelessly charging an electric vehicle. The apparatus includes means for obtaining a request from the electric vehicle for a level of charging power to be delivered from a power antenna circuit to the electric vehicle via a charging field. The apparatus further includes means for controlling a current or a voltage of the power antenna circuit based on a power efficiency factor and the requested level of charging power.

Another aspect of the subject matter described in the disclosure provides a non-transitory computer readable medium. The medium comprising code that, when executed, causes an apparatus to obtain a request for a level of charging power to be delivered from a power antenna circuit to the vehicle via a charging field. The medium further includes code that, when executed, causes the apparatus to control a current or voltage of the power transmitter based on a power efficiency factor and the requested level of charging power.

DETAILED DESCRIPTION

The detailed description set forth below in connection with the appended drawings is intended as a description of certain implementations of the invention and is not intended to represent the only implementations in which the invention may be practiced. The term "exemplary" used throughout this description means "serving as an example, instance, or illustration," and should not necessarily be construed as preferred or advantageous over other exemplary implementations. The detailed description includes specific details for the purpose of providing a thorough understanding of the disclosed implementations. In some instances, some devices are shown in block diagram form.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

An electric vehicle is used herein to describe a remote system, an example of which is a vehicle that includes, as part of its motion capabilities, electrical power derived from a chargeable energy storage device (e.g., one or more rechargeable electrochemical cells or other type of battery). As non-limiting examples, some electric vehicle may be hybrid electric vehicles that include besides electric motors, a traditional combustion engine for direct locomotion or to charge the vehicle's battery. Other electric vehicles may draw all locomotion ability from electrical power. The electric vehicle is not limited to an automobile and may include motorcycles, carts, scooters, and the like. By way of example and not limitation, a remote system is described herein in the form of the electric vehicle (EV). Furthermore, other remote systems that may be at least partially powered using a chargeable energy storage device are also contemplated (e.g., electronic devices such as personal computing devices and the like).

Figure 1:
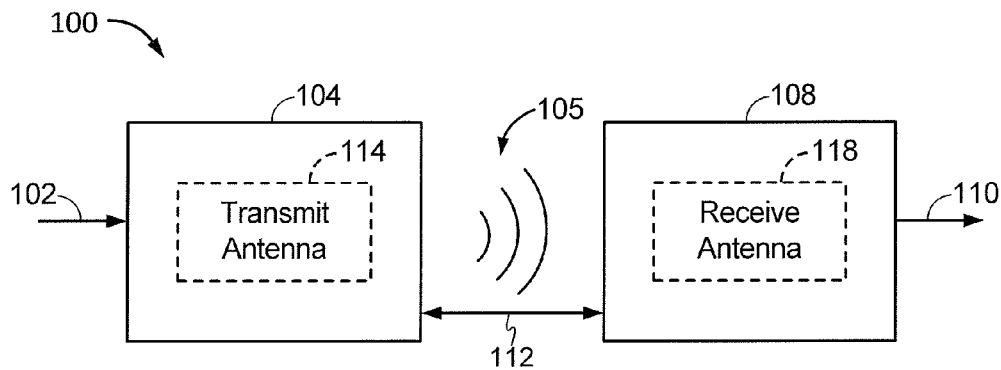
FIG. 1 is a functional block diagram of a wireless power transfer system, in accordance with one exemplary implementation.

FIG. 1 is a functional block diagram of a wireless power transfer system 100, in accordance with one exemplary implementation. An input power 102 may be provided to a transmitter 104 from a power source (not shown in this figure) to generate a wireless (e.g., magnetic or electromagnetic) field 105 for performing energy transfer. A receiver 108 may couple to the wireless field 105 and generate an output power 110 for storing or consumption by a device (not shown in this figure) coupled to the output power 110. Both the transmitter 104 and the receiver 108 are separated by a distance 112.

In one exemplary implementation, the transmitter 104 and the receiver 108 are configured according to a mutual resonant relationship. When the resonant frequency of the receiver 108 and the resonant frequency of the transmitter 104 are substantially the same or very close, transmission losses between the transmitter 104 and the receiver 108 are minimal. As such, wireless power transfer may be provided over a larger distance in contrast to purely inductive solutions that may require large antenna coils which are very close (e.g., sometimes within millimeters). Resonant inductive coupling techniques may thus allow for improved efficiency and power transfer over various distances and with a variety of inductive coil configurations.

The receiver 108 may receive power when the receiver 108 is located in the wireless field 105 produced by the transmitter 104. The wireless field 105 corresponds to a region where energy output by the transmitter 104 may be captured by the receiver 108. The wireless field 105 may correspond to the "near-field" of the transmitter 104 as will be further described below. The transmitter 104 may include a transmit antenna or coil 114 for transmitting energy to the receiver 108. The receiver 108 may include a receive antenna or coil 118 for receiving or capturing energy transmitted from the transmitter 104. The near-field may correspond to a region in which there are strong reactive fields resulting from the currents and charges in the transmit coil 114 that minimally radiate power away from the transmit coil 114. The near-field may correspond to a region that is within about one wavelength (or a fraction thereof) of the transmit coil 114.

As described above, efficient energy transfer may occur by coupling a large portion of the energy in the wireless field 105 to the receive coil 118 rather than propagating most of the energy in an electromagnetic wave to the far field. When positioned within the wireless field 105, a "coupling mode" may be developed between the transmit coil 114 and the receive coil 118. The area around the transmit antenna 114 and the receive antenna 118 where this coupling may occur is referred to herein as a coupling-mode region.

Figure 2:
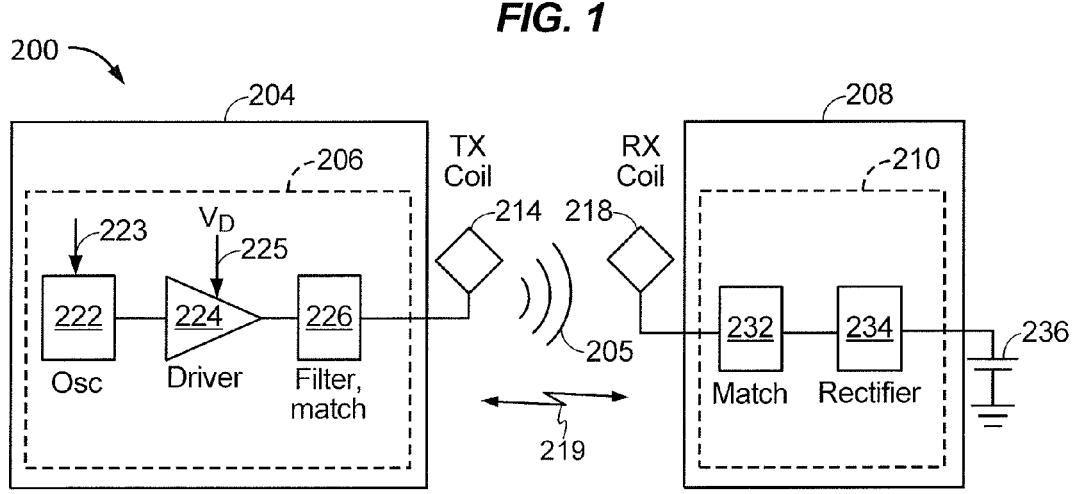
FIG. 2 is a functional block diagram of a wireless power transfer system, in accordance with another exemplary implementation.

FIG. 2 is a functional block diagram of a wireless power transfer system 200, in accordance with another exemplary implementation. The system 200 includes a transmitter 204 and a receiver 208. The transmitter 204 may include a transmit circuitry 206 that may include an oscillator 222, a driver circuit 224, and a filter and matching circuit 226. The oscillator 222 may be configured to generate a signal at a desired frequency that may be adjusted in response to a frequency control signal 223. The oscillator 222 may provide the oscillator signal to the driver circuit 224. The driver circuit 224 may be configured to drive the transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave. For example, the driver circuit 224 may be a class E amplifier.

The filter and matching circuit 226 may filter out harmonics or other unwanted frequencies and match the impedance of the transmitter 204 to the transmit antenna 214. As a result of driving the transmit antenna 214, the transmit antenna 214 may generate a wireless field 205 to wirelessly output power at a level sufficient for charging a battery 236 of the electric vehicle 505, for example.

The receiver 208 may include a receive circuitry 210 that may include a matching circuit 232 and a rectifier circuit 234. The matching circuit 232 may match the impedance of the receive circuitry 210 to the receive antenna 218. The rectifier circuit 234 may generate a direct current (DC) power output from an alternate current (AC) power input to charge the battery 236, as shown in FIG. 2. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205. The receiver 208 may be configured to determine whether an amount of power transmitted by the transmitter 204 and received by the receiver 208 is appropriate for charging the battery 236.

Figure 3:
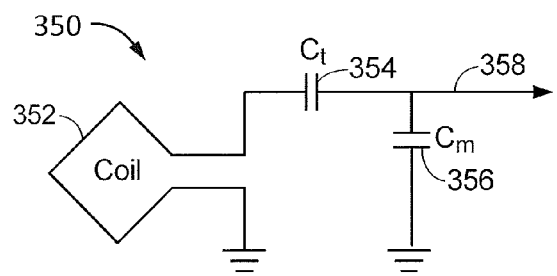
FIG. 3 is a schematic diagram of a portion of transmit circuitry or receive circuitry of FIG. 2 including a transmit or receive antenna, in accordance with exemplary implementations.

FIG. 3 is a schematic diagram of a portion of the transmit circuitry 206 or the receive circuitry 210 of FIG. 2, in accordance with exemplary implementations. As illustrated in FIG. 3, a transmit or receive circuitry 350 may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy for coupling to another "antenna." The antenna may also be referred to as a coil of a type that is configured to wirelessly output or receive power, for example made with one or more turns of a Litz wire, a physical core structure, for example comprising a soft ferrite material, and a conductive back plate, for example comprising Aluminum. As used herein, the antenna 352 is an example of a "power transfer component" of a type that is configured to wirelessly output and/or receive power. The antenna 352 may include an air core or a physical core such as a ferrite core (not shown in this figure).

As stated, efficient transfer of energy between the transmitter 104 (transmitter 204 as referenced in FIG. 2) and the receiver 108 (receiver 208 as referenced in FIG. 2) may occur during matched or nearly matched resonance between the transmitter 104 and the receiver 108. However, even when resonance between the transmitter 104 and receiver 108 are not matched, energy may be transferred, although the efficiency may be affected. For example, the efficiency may be less when resonance is not matched. Transfer of energy occurs by coupling energy from the wireless field 105 (wireless field 205 as referenced in FIG. 2) of the transmit coil 114 (transmit coil 214 as referenced in FIG. 2) to the receive coil 118 (receive coil 218 as referenced in FIG. 2), residing in the vicinity of the wireless field 105, rather than propagating the energy from the transmit coil 114 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, a capacitor 354 and a capacitor 356 may be added to the transmit or receive circuitry 350 to create a resonant circuit that selects a signal 358 at a resonant frequency. Accordingly, for larger diameter antennas, the size of capacitance needed to sustain resonance may decrease as the diameter or inductance of the loop increases.

Furthermore, as the diameter of the antenna increases, the efficient energy transfer area of the near-field may increase. Other resonant circuits formed using other components are also possible. As another non-limiting example, a capacitor may be placed in parallel between the two terminals of the circuitry 350. For transmit antennas, the signal 358, with a frequency that substantially corresponds to the resonant frequency of the antenna 352, may be an input to the antenna 352.

In FIG. 1, the transmitter 104 may output a time varying magnetic (or electromagnetic) field with a frequency corresponding to the resonant frequency of the transmit coil 114. When the receiver 108 is within the wireless field 105, the time varying magnetic (or electromagnetic) field may induce a current in the receive coil 118. As described above, if the receive coil 118 is configured to resonate at the frequency of the transmit coil 114, energy may be efficiently transferred. The AC signal induced in the receive coil 118 may be rectified as described above to produce a DC signal that may be provided to charge or to power a load.

Many current wireless vehicle charging systems require the electric vehicle being charged to be stationary, e.g., stopped near or above the wireless charging system such that the electric vehicle maintains presence within the wireless field generated by the wireless charging system for transferring charge. Thus, while the electric vehicle is being charged by such a wireless charging system, the electric vehicle may not be used for transportation. Dynamic wireless charging systems that are capable of transferring power across free space may overcome some of the deficiencies of stationary wireless charging stations.

On a roadway with a dynamic wireless charging system comprising a plurality of the charging base pads placed linearly along a path of travel, the electric vehicle may travel near the plurality of the charging base pads while traveling on the road. Should the electric vehicle desire to charge its batteries or source energy to power the electric vehicle while traveling, in order to extend its range or reduce the need to charge later, the electric vehicle may request the dynamic wireless charging system activate the charging base pads along the electric vehicle's path of travel. Such dynamic charging may also serve to reduce or eliminate the need for auxiliary or supplemental motor systems in addition to the electric locomotion system of the electric vehicle 505 (e.g., a secondary gasoline engine of the hybrid/the electric vehicle 505). As such, dynamic wireless charging systems and methods that efficiently and effectively activate the charging base pads along a path of travel of the electric vehicle are needed.

Figure 4:
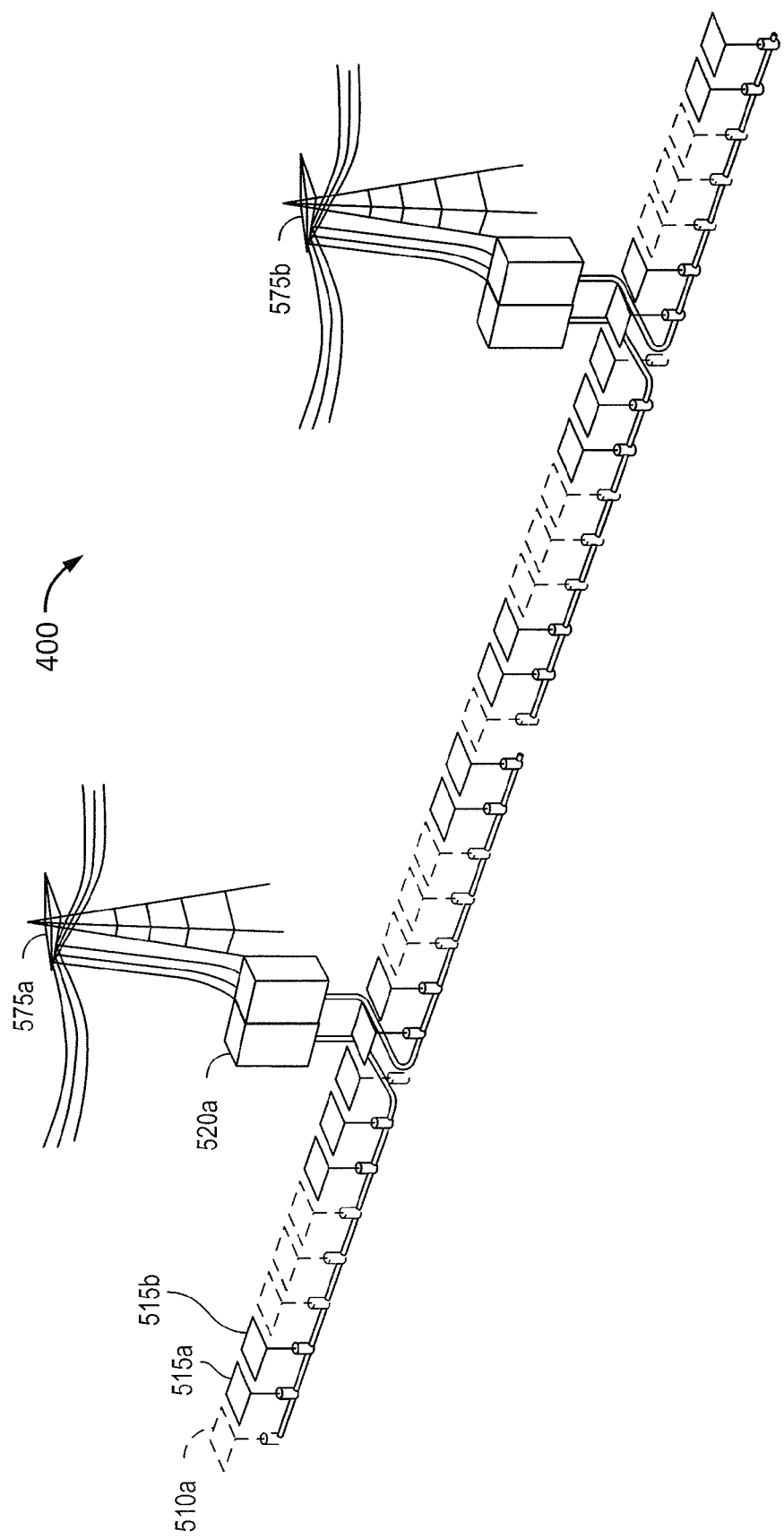
FIG. 4 illustrates an exemplary configuration of charging base pads installed in a dynamic wireless charging system.

FIG. 4 illustrates an exemplary configuration of charging base pads installed in a dynamic wireless charging system 400. The charging base pads 515 may be installed in a lane of a roadway. The Electric Vehicle Support Equipment (EVSE) 520 is shown off to one side of the charging base pads and may broadcast a signal to or receiving a signal from passing electric vehicles 505. The EVSEs 520 may also be connected to an electrical tower 575. The electrical tower may supply power to the EVSEs 520 which may in turn power the charging base pads 515. The dynamic wireless charging system 400 may also contain one or more proximity devices 510 located among the charging base pads 515 to detect one or more electric vehicles 505 along the roadway.

Figure 5A:
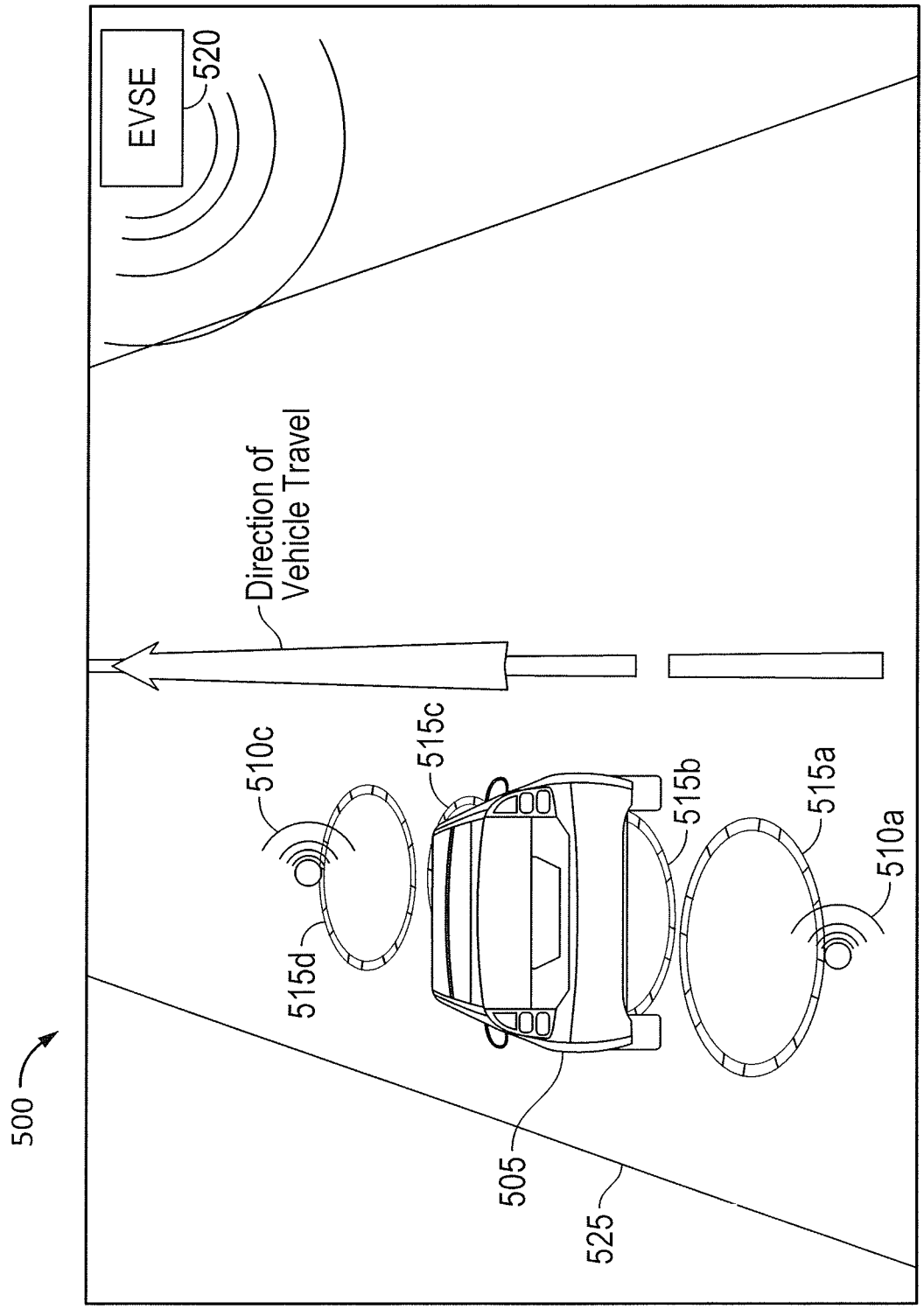
FIG. 5A illustrates a diagram of an exemplary dynamic wireless charging system for charging an electric vehicle depicting a vehicle as it travels above a charging base pad.

FIG. 5A illustrates a diagram of an exemplary dynamic wireless charging system 500 for charging an electric vehicle 505 depicting an overhead perspective of the electric vehicle 505 as it travels along a roadway 525 above a number of charging base pads 515. FIG. 5A depicts some of the same elements as FIG. 4. FIG. 5A depicts the electric vehicle 505 traveling in the left lane of the roadway 525 above the charging base pad 515b.

In some embodiments, the EVSE 520 may receive charging requests from the passing electric vehicle 505 on a roadway 525 or broadcast the services of the dynamic wireless charging system 500 to a passing electric vehicle 505 along the roadway regardless of what lane the electric vehicle 505 is in. The EVSE 520 may check to determine whether the electric vehicle 505 is allowed to receive a charge from the charging base pads 515a-515d (e.g., whether the electric vehicle 505 charging circuitry is compatible with the charging circuitry of the dynamic wireless charging system 500, or whether the electric vehicle 505 has an approved account that will be debited for any charging services provided by the dynamic wireless charging system 500). Any negotiations or handshaking required between the dynamic wireless charging system 500 and the electric vehicle 505 before the electric vehicle 505 is allowed to receive a charge may take place via these communications. Further, the electric vehicle 505 may communicate its GPS position, vector, and speed to the EVSE 520. The EVSE 520 may communicate with the electric vehicle 505 via Bluetooth, LTE, Wi-Fi, DSRC, or any similar manner of communication.

If the EVSE 520 determines that the electric vehicle 505 may receive a charge, the EVSE 520 may provide additional communications or visual indicators (not shown in this figure) regarding the alignment of the electric vehicle 505 along the width of the roadway to the electric vehicle 505 or to the operator therein. Additionally, the EVSE 520 may provide indicators of the locations of the charging base pads 515a-515d. The additional communications or visual indicators may instruct the electric vehicle 505 or its operator to how and where to move the electric vehicle 505 to the lane where the charging base pads 515a-515d are installed.

Figure 5B:
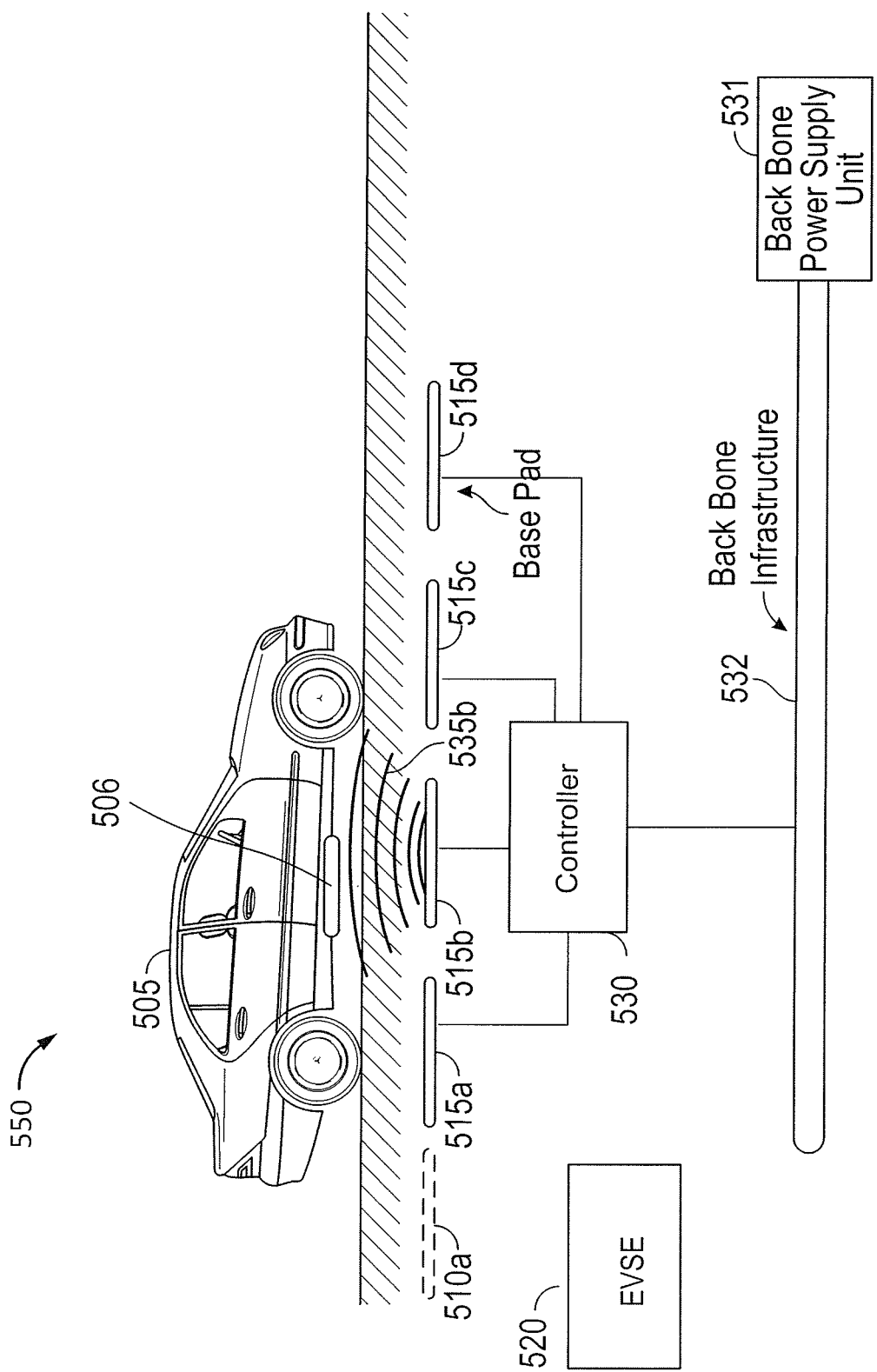
FIG. 5B illustrates a diagram of an exemplary dynamic wireless charging system for charging an electric vehicle depicting a vehicle as it travels above a charging base pad.

Additionally, the EVSE 520 may activate a charging base pad controller 530 (as shown in FIG. 5B) and the proximity devices 510a-510c (proximity device 510b not shown). Activating the charging base pad controller 530 comprises providing the charging base pad controller 530 the power needed to function. In another embodiment, activating the charging base pad controller 530 may comprise providing a signal enabling the charging base pad controller 530 to control the charging base pads 515a-515d. The charging base pad controller 530 may be deactivated prior to the EVSE 520 determining the electric vehicle 505 is allowed to charge in order to save energy and ensure the charging base pads 515a-515d do not generate a wireless field 535 (as shown in FIG. 5B) improperly.

Activating the proximity devices 510a-510c comprises providing the proximity devices 510a-510c the power needed to function and provide a detection signal. The proximity device 510a-510c may be deactivated prior to the EVSE 520 determining the electric vehicle 505 is allowed to charge in order to save energy. In an embodiment, the charging base pad controller 530 may be incorporated into the EVSE 520. In another embodiment, the charging base pad controller 530 may be a separate equipment (as shown in FIG. 5B). In some other embodiment, the proximity devices 510a-510c may be activated by the charging base pad controller 530. Additionally, an embodiment may use the communicated information to determine if the electric vehicle 505 is leaving the lane in which the charging base pads 515a-515d are installed.

The proximity devices 510a-510c may provide a signal when they detect the presence of the electric vehicle 505. The proximity devices 510a-510c may be placed along the path of the roadway 525 such that the electric vehicles 505 traveling along the roadway 525 are detected by one of the proximity devices 510a-510c before the electric vehicle 505 passes above the charging base pads 515a-515d without requiring any communication with the electric vehicle 505. When the proximity device 510 detects the electric vehicle 505, it may generate an output signal to another device. In an embodiment, the other device may be the EVSE 520. In another embodiment, the other device may be the charging base pad controller 530. In an embodiment, the proximity devices 510a-510d may be inductive sensors, wherein an inductive load indicates the presence of the electric vehicle 505 which is communicated to the other device (e.g., the EVSE). In another embodiment, the proximity device 510 may be a proximity transmitter (not shown) mounted along the roadway with a proximity receiver mounted (not shown) on the electric vehicle 505. As the electric vehicle 505 approaches the charging base pads 515, the proximity receiver may generate a signal once in proximity to the proximity transmitter. The generated signal may then be communicated to the EVSE to give a rough location estimate of the electric vehicle 505 to be used to activate the subsequent charging base pads 515. In another embodiment, the proximity device 510 may be charging base pad 515 that is not delivering wireless power. The proximity device 510a may be positioned before the charging base pad 515a. Additionally, proximity device 510b may be located between the charging base pads 515b and 515c. In an embodiment, the proximity device 510b may provide detection of any electric vehicle 505 that enters the left lane of the roadway 525 after passing the proximity device 510a. The proximity device 510c may be located after the charging base pad 515d. The proximity device 510c may indicate when the electric vehicle 505 passes the charging base pad 515c. In an embodiment, additional proximity devices 510 may be installed between each charging base pad 515a-515d. More proximity devices 510 may provide more opportunities to detect the electric vehicle 505 that enters the left lane of the roadway 525 after passing the first the proximity device 510 and the first charging base pad 515a.

The proximity signal from the proximity devices 510a-510c may be used to track the electric vehicle 505 duration within the wireless fields 535 of the charging base pads 515a-515d or to verify position calculations as determined by the charging base pad controller 530 load analysis. In another embodiment, the proximity device 510 may generate a signal communicated to the electric vehicle 505 to inform the electric vehicle 505 that it is entering an area serviced by the dynamic wireless charging system 500. The signal may be communicated to the electric vehicle 505 via the EVSE 520, the charging base pad controller 530, directly from the proximity device 510, or via roadside signs and/or indicators. The signal may be communicated via any communication means (e.g., magnetic beaconing, cellular communications, Wi-Fi, RFID, etc.). The electric vehicle 505 may use this proximity signal communicated for any number of purposes, e.g., to activate the electric vehicle 505 wireless charging circuit and the power receiving pad 506 (as shown in FIG. 5B), to provide an alert or message to the operator indicating that the electric vehicle 505 is nearing or above one of the charging base pads 515a-515d, to activate alignment and charging position detection, etc.

The charging base pad controller 530 may control the activation of one or more of the charging base pads 515a-515d. The charging base pad controller 530 may not activate the charging base pads 515a-515d until one of the proximity devices 510a-510c detects the electric vehicle 505 in the left lane of the roadway 525 and sends a signal indicating such detection to the charging base pad controller 530. This ensures that the charging base pads 515a-515d are not improperly activated, e.g., activated when there is not an electric vehicle 505 being allowed to receive a charge from the charging base pads 515a-515d above the charging base pads 515a-515d.

The charging base pads 515a-515d may provide the transfer of power to the electric vehicle 505. The charging base pads 515a-515d may receive an input signal provided by the charging base pad controller 530 or of input power and generate a wireless field 535 through which power may wirelessly be transferred to a device entering into the wireless field 535, e.g., the electric vehicle 505. The charging base pads 515 may comprise a loop antenna as depicted in FIG. 3 above.

The charging base pads 515a-515d may be embedded in the roadway 525 such that the electric vehicle 505 traveling along the roadway 525 pass above the charging base pads 515a-515d. In such an instance, the electric vehicle 505 may comprise a battery (not shown in this figure), a charging circuit (not shown in this figure), and a power receiving pad 506 (as shown in FIG. 5B) located on the bottom of the electric vehicle 505 such that there is minimal interference and distance between the power receiving pad 506 and the charging base pads 515a-515d in the roadway 525. In another embodiment, the charging base pads 515a-515d may be mounted along the side of the roadway 525 or above the roadway 525. In other embodiments, the electric vehicle 505, comprising the battery and charging circuit, may have the power receiving pad 506 located such that it is capable of receiving wireless power from the charging base pads 515a-515d. In even other embodiments, the electric vehicle 505 may not comprise a battery, but instead use energy received from the charging base pads 515a-515d to generate locomotive force to propel the vehicle or power vehicle devices. The charging base pads 515a-515d may be designed such that they maximize efficient transfer of wireless power to the power receiving pad 506.

In an embodiment, the size of the charging base pads 515a-515d may of a diameter of half a meter (0.5 m). In some other embodiment, the charging base pads 515a-515d may be of a diameter of more than half a meter. In some other embodiment, the charging base pads 515a-515d may be of a diameter less than half a meter. In another embodiment, the charging base pads 515a-515d may be of a non-circular shape, for example, but not limited to, rectangular, octagonal, elliptical, etc. A person of ordinary skill may know the size of the charging base pads 515 may vary with the power transfer requirements. The size of the charging base pads 515a-515d may be established by a calculation of what size provides the most efficient power transfer for the greatest amount of power transmission within a distance.

Additionally, the charging base pads 515a-515d may be spaced along the roadway 525 with a distance between each pad 515a-515d such that the power receiving pad 506 on the electric vehicle 505 may continuously receive wireless power from at least one the charging base pad 515 while traveling along the roadway 525. In an embodiment, the charging base pads 515a-515d may be installed in the roadway 525 end to end such that there is no space between the charging base pads 515a-515d and thus no location where the electric vehicle 505 may not receive wireless power. In another embodiment, the charging base pads 515a-515d may be installed with a distance of half a meter (0.5 m) between each of the charging base pads 515a-515d. In another embodiment, the charging base pads 515 may be spaced such that no two wireless fields 535 overlap. In some embodiments, the charging base pads 515a-515d may overlap with each other. In another embodiment, the charging base pads 515 may be spaced such that the most efficient transfer permitted by ensuring now two wireless fields 535 overlap.

If the EVSE 520 determined the electric vehicle 505 is allowed to receive a charge, the EVSE 520 may activate the charging base pad controller 530 (not shown in this figure) as mentioned above. The charging base pad controller 530 or the EVSE 520 may then activate one or more of the proximity devices 510a-510c to determine when to activate the individual the charging base pads 515b-515d. In one embodiment, the electric vehicle 505 may move to the left lane from the right lane of roadway 525 after passing the proximity device 510a and the charging base pad controller 530 may not activate any of the charging base pads 515a-515d because proximity device 510a did not detect the electric vehicle 505. Therefore, the electric vehicle 505 may not receive a charge and the charging base pad controller 530 may be unable to estimate the position of the vehicle using load analysis from the charging base pads 515a-515d.

Once the proximity devices 510a-510c have been activated, the proximity device 510b (not shown in this figure) may detect the electric vehicle 505 as the electric vehicle 505 travels from the charging base pad 515b to the charging base pad 515c. When the proximity device 510b detects the electric vehicle 505, it may send a signal to the charging base pad controller 530 indicating the detection of the electric vehicle 505. The charging base pad controller 530 may receive that signal and activate the first charging base pad 515 in the path of the vehicle in anticipation of the electric vehicle 505 traveling over it, here charging base pad 515c. The charging base pad controller 530 may determine the time at which to activate the charging base pad 515c based upon the vehicle speed, vector, and position communicated to the EVSE 520 from the electric vehicle 505 and/or determined from the proximity signals from the proximity devices 510a-510c.

Once the electric vehicle 505 passes above the activated charging base pad 515c, the charging base pad controller 530 may use load analysis to determine when the electric vehicle 505 is transitioning between the charging base pads 515b and 515c and further transitioning between the charging base pads 515c and 515d. The load analysis may allow the charging base pad controller 530 to activate the subsequent charging base pad 515d and deactivate the prior charging base pad 515c in an efficient manner.

FIG. 5B illustrates a diagram of an exemplary dynamic wireless charging system 550 for charging the electric vehicle 505, in accordance with an exemplary implementation. FIG. 5B depicts a side view of the electric vehicle 505 traveling along the roadway 525. The direction of travel along the roadway 525 is from the left to the right of the page. The dynamic wireless charging system 550 may be installed along the roadway 525 such that one or more the electric vehicles 505 traveling on the roadway 525 may obtain power from the charging base pads 515a-515d while the electric vehicle 505. The dynamic wireless charging system 550 may comprise the EVSE 520 connected to a charging base pad controller 530. The charging base pad controller 530 may be connected to one or more charging base pads 515a-515d, each of which may be deactivated so as to not improperly generate a wireless field 535. The charging base pad controller 530 may also be connected to a back bone infrastructure 532 which is in turn connected to a back bone power supply unit 531. The back bone infrastructure 532 and the back bone power supply unit 531 may supply power to one or more charging base pad controllers 530. Additionally, one or more proximity devices 510a-510c (510b and 510c not shown in this figure) may be connected to either the EVSE 520 or the charging base pad controller 530. Additionally, the dynamic wireless charging system 550 may utilize at least one roadway 525 along which the dynamic wireless charging system 550 may be installed and at least one electric vehicle 505 with at least one power receiving pad 506, which may wirelessly obtain electric power from one or more of the charging base pads 515a-515d via the power receiving pad 506. In another embodiment, the EVSE 520 and the charging base pad controller 530 may be combined into a single unit.

The dynamic wireless charging system 550 functions to transfer wireless power to an object in motion, e.g., the electric vehicle 505. In one embodiment, the dynamic wireless charging system 550 may enable the wireless charging of a battery (not shown in this figure) of the electric vehicle 505 traveling along the roadway 525 above the charging base pads 515a-515d. As discussed above, the EVSE 520 may perform the initial communications between the dynamic wireless charging system 550 and the electric vehicle 505. Once all permissions have been granted and the electric vehicle 505 is determined to be allowed to charge from the charging base pads 515a-515d, the EVSE 520 may activate the proximity devices 510 and the charging base pad controller 530. The charging base pad controller 530 may control the activation and deactivation of the charging base pads 515a-515d connected to the charging base pad controller 530 and may perform the load analysis of the connected the charging base pads 515a-515d to estimate the position of the electric vehicle 505 receiving wireless power from the charging base pads 515a-515d while the electric vehicle 505 is in motion.

The proximity device 510 may function to detect when the electric vehicle 505 or other electric device capable of wireless power transfer enters the vicinity of the charging base pads 515a-515d. The charging base pads 515a-515d may provide the wireless power to the electric vehicle 505 or other electric device capable of wireless charging via at least one wireless field 535a-535d (wireless field 535b as shown). The roadway 525 may serve as the point of installation for the dynamic wireless charging system 550. The electric vehicle 505 may function to transport people or objects between locations using electric force. Continued driving may drain the charge contained within the battery. The power receiving pad 506 of the electric vehicle 505 may be used to receive power transmitted wirelessly by the charging base pads 515a-515d. The power receiving pad 506 may be connected to the battery to charge it via a charging circuit (not shown in this figure) or to the electric motor providing motion to the electric vehicle 505.

The charging base pad controller 530 may control the charging base pads 515a-515d such that they are activated and deactivated as required in relation to the electric vehicle 505. The dynamic wireless charging system 500 may comprise at least one the charging base pad controller 530, which may provide activation and deactivation control to at least one charging base pad 515. The charging base pad controller 530 may be connected to each of the charging base pads 515a-515d that the charging base pad controller 530 controls. In an alternate embodiment, the charging base pad controller 530 may be integrated into the EVSE 520, such that the EVSE 520 controller serves to control the charging base pads 515a-515d and each the charging base pads 515a-515d may be connected directly to the EVSE 520.

Additionally, the charging base pad controller 530 may perform the calculations required for the load analysis discussed above. The said load analysis may allow the charging base pad controller 530 to estimate the position of the electric vehicle 505 while the electric vehicle 505 is moving along the roadway 525 above the charging base pads 515a-515d and receiving wireless power from the charging base pads 515a-515d via wireless field 535a-535d. The charging base pad controller 530 determines the position of the electric vehicle 505 using only the load profile of the electric vehicle 505. Using load analysis to determine the position of the electric vehicle 505 above the charging base pad 515 may provide greater resolution, accuracy, robustness of the system, and real time capability of the position estimation of the dynamic wireless charging system 500.

In an embodiment, the receiver used by the electric vehicle 505 may be a coil antenna and the charging base pad 515a-515d may comprise a coil antenna. In an alternate embodiment, either or both of the power receiving pad 506 and the charging base pad 515 may be a loop antenna comprising a coil as described above in reference to FIG. 3.

Figure 6:
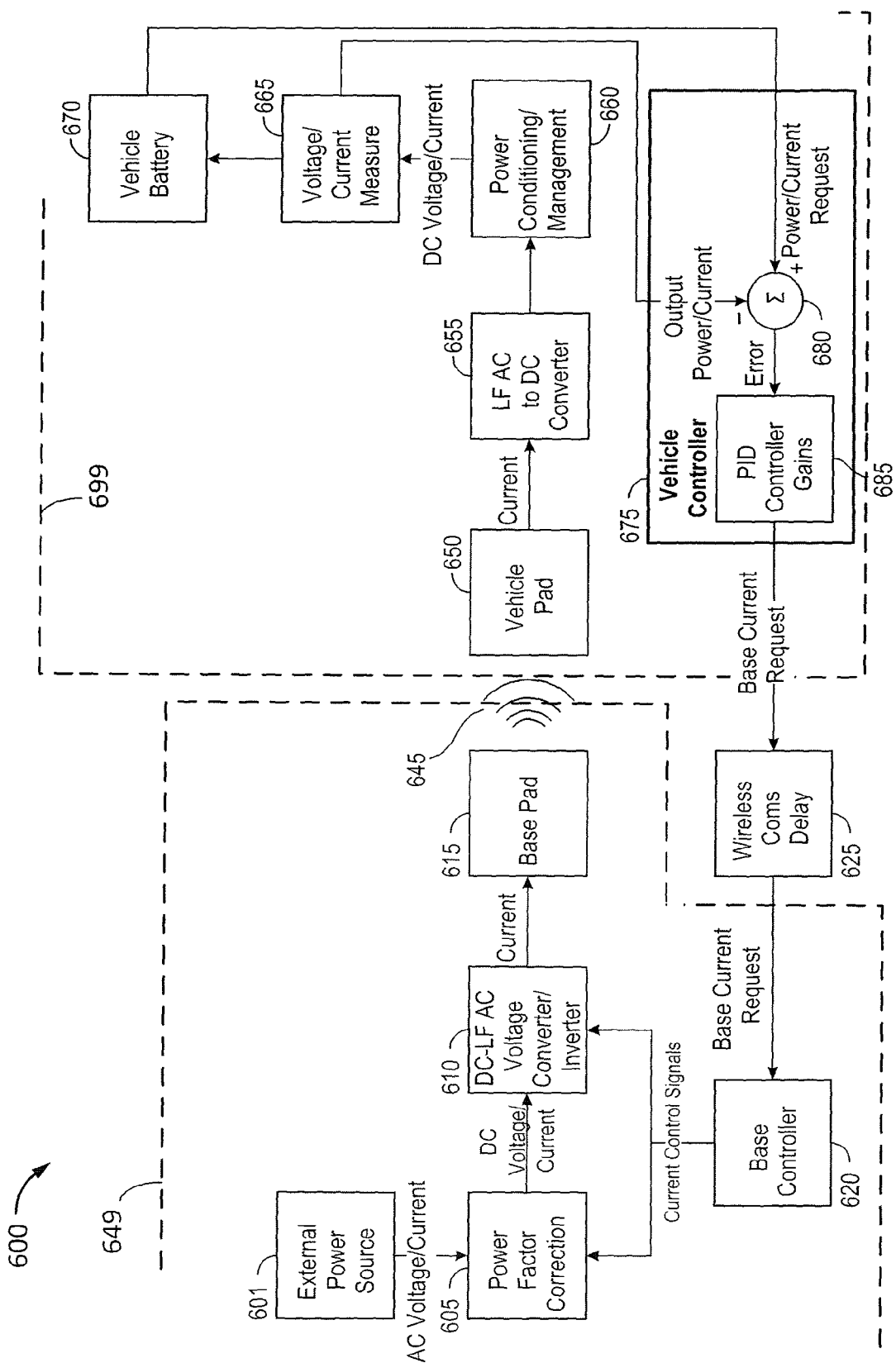
FIG. 6 is a functional block diagram of an exemplary communication and wireless power transfer between an electric vehicle and a base pad.

FIG. 6 is a functional block diagram of an exemplary wireless charging system 600. The charging system 600 may comprise a wireless power transmitter system 649 and a wireless power receiver system 699. The wireless power transmitter system 649 may comprise components found in the dynamic wireless charging systems 500 and 550. The wireless power receiver system 699 may comprise components found in the electric vehicle 505. The wireless power transmitter system 649 may include a base controller 620 that may include a processor (not shown) and/or other controller circuitry configured to control or coordinate functions performed by the blocks shown in the wireless power transmitter system 649. The wireless power transmitter system 649 may comprise an external power source 601 that may supply alternating current (AC) voltage/current to a power factor correction unit 605. The power factor correction unit 605 may adjust the power factor of external power source 601 and may convert the AC voltage/current to a direct current (DC) voltage/current. The power factor correction unit may also improve the stability and efficiency of the external power source 601. The power factor correction unit 605 may then supply DC voltage/current to a DC low frequency (LF) AC voltage converter/inverter 610. The DC-LF AC voltage converter/inverter 610 converts the DC voltage to an AC current. The DC-LF AC voltage converter/inverter 610 may then provide the AC current to a base pad 615. The base pad 615 may be similar to the base pad 515, the transmitter 104, and the transmitter 204. For example, the base pad 615 may comprise components similar to those described above with respect to the transmitter 104 and the transmitter 204 of FIGS. 1 and 2. In some embodiments the base pad 615 may comprise a pad comprising at least a portion of the components of the transmitter 104 and the transmitter 204. The base pad 615 then uses a power antenna circuit with the AC current to generate a magnetic field 645 to provide wireless power to the wireless power receiver system 699. The power antenna circuit of base pad 615 may comprise a wireless power transmit antenna similar to the transmit antennas/coils 114, 214, 352 described above. In some embodiments, the base pad 615 may include one or more of the blocks of the wireless power transmitter system 649. For example, the base pad 615 may include the base controller 620, the power factor correction unit 605, and/or the DC-LF AC voltage converter/inverter 610. In some embodiments, the base pad 615 may include a primary resonator.

The wireless power receiver system 699 may comprise a vehicle pad 650. The vehicle pad 650 may be similar to the power receiving pad 506, the receiver 108 and the receiver 208. The wireless power receiver system 699 may include a vehicle controller 675 that may include a processor (not shown) and/or other controller circuitry configured to control or coordinate functions performed by the blocks shown in the wireless power receiver system 699. For example, the vehicle pad 650 may comprise components similar to those described above with respect to the receiver 108 and the receiver 208 of FIGS. 1 and 2. In some embodiments the vehicle pad 650 may comprise a pad comprising at least a portion of the components of the receiver 108 and the receiver 208. The vehicle pad 650 may be configured to receive wireless power from the power antenna circuit of the base pad 615 via the magnetic field 645. In some embodiments, the vehicle pad 650 may include one or more of the blocks of the wireless power receiver system 699. For example, the vehicle pad 650 may include an LF AC to DC converter 655, a power conditioning/management unit 660, and/or a voltage/current measure unit 665. In some embodiments, the vehicle pad 650 may include a secondary resonator.

The magnetic field 645 produces an AC current at the vehicle pad 650 and the vehicle pad 650 then supplies that current to the LF AC to DC converter 655. The LF AC to DC converter 655 converts the AC current into a DC voltage/current. The LF AC to DC converter 655 then supplies the DC voltage/current to the power conditioning/management unit 660. The power conditioning/management unit 660 may modify the DC voltage/current to improve the quality of power received by the vehicle pad 650. The power conditioning/management unit 660 may improve quality by providing surge protection, modifying the power based on certain requirements of the wireless power receiver 699 components, or other modifications to improve quality and/or performance. The power conditioning/management unit 660 may then provide the DC voltage/current to a vehicle battery 670 for charging and power supply. The wireless power receiver system 699 may measure the DC voltage/current supplied to the vehicle battery 670 through the voltage/current measure unit 665. The voltage/current measure unit 665 then may provide the measured output power/current to a vehicle controller 675. The vehicle controller 675 may include a processor and or other controller circuitry. The vehicle controller 675 may also receive a power/current request from the vehicle battery 670 which may provide the request based on the DC voltage/current supplied from the power conditioning/management unit 660. The vehicle controller may comprise a comparator 680 and a proportional-integral-derivative (PID) controller gains 685. The comparator 680 may compare the output power/current from the voltage/current measure unit 665 and the power/current request from the vehicle battery 670. The comparator may then generate an error value based on the comparison and supply the error value to the PID controller gains 685. The PID controller gains 685 receives the error value and may attempt to minimize the error value of the comparator 680 by adjusting control outputs, e.g., adjusting the power/current request from the vehicle battery 670 to generate the base current request from the vehicle controller 675. The base current request specifies the amount of current requested to charge the vehicle battery 670. The base current request from the vehicle controller 675 may be based on the error value and the power/current request to factor in any losses, errors, or inefficiencies from the current requested and the current received by the vehicle battery 670.

The vehicle controller 675 may send the base current request via a communication antenna to the base controller 620 of the wireless power transmitter system 649 over a communication link. The communication link may be any type of communication link such as, for example, Bluetooth, zigbee, cellular, radio frequency (RF), wireless local area network (WLAN), etc. The base controller 620 may receive the base current request via a communication antenna and transmit such request to the power factor correction unit 605 and the DC-LF AC voltage converter/inverter 610 so that each may adjust their function to better match the new request from the vehicle controller 675.

However, transmissions to the base controller 620 over the communication link may experience a wireless communications delay 625. The wireless communications delay 625 may vary depending signal strength, error rate, environmental factors, etc. In some embodiments, the wireless communications delay 625 may vary between 10-200 ms. In some embodiments, the response of the wireless power transmitter system 649 to the base current request of the wireless power receiver system 699 may be limited by the wireless communications delay 625 of the communication link and may result in inefficiencies. For example, the vehicle controller 675 may not be able to send its updated output error values or output power measurements frequently enough to capture certain changes of the wireless charging system 600 due to the wireless communications delay 625. The base controller 620 then sends current control signals to the power factor correction unit 605 and the DC-LF AC voltage converter/inverter 610 that indicate the base current request from the vehicle controller 675.

To improve inefficiencies caused by the communications delay 625, the vehicle controller 675 may send a power request to the base controller 620 rather than a continuously sent and adjusted base current request that is derived based on an error value determined based on comparing a desired current to the actual measured current received at the vehicle pad 650. The power request may comprise a signal indicating an initial requested level of charging power to be delivered from the base pad 615 to the vehicle pad 650. As will be further described below, in response to the initial power request, for some period of time, rather than relying on feedback from the receiver system 699 indicative of a difference between the power received and the desired power level, the base controller 620 may unilaterally adjust the input power supplied to the base pad 615 based on estimating power received by the receiver system 699. The unilateral adjustment of input power controlled by the base controller 620 may be performed without receiving or relying on feedback from the receiver system 699 for some period of time and be based on certain electrical characteristics measured at the transmitter system 649 such as, for example, current, impedance, voltage, resistance, inductance, resonant frequency, phase, and the like). Sending a power request and adjusting input power in response to efficiency estimates or other information measured at the transmitter system 649 rather than sending a base current request as described above offers several advantages. For example, the vehicle controller 675 may only need to communicate an initial power request to the base controller 620 and the base controller 620 may adjust the current accordingly for some period of time without further power requests. In some embodiments, the vehicle controller 675 may communicate subsequent power requests when the vehicle battery changes its power request. Upon receiving the power request, the base controller 620 may determine the appropriate current to supply to the base pad 615 to meet the power request of the vehicle controller 675. In the wireless charging system 600, the vehicle controller 675 sends a base current request to the base controller 620 and the base controller 620 attempts to supply that current through the base pad 615. However, with a base current request, the vehicle battery 670 may draw less current as the vehicle battery 670 charges (as the impedance of the battery increases) and thus may require frequent new current requests to accommodate the changing received current. Accordingly, in accordance with embodiments described below the vehicle controller 675 may communicate less frequently with the base controller 620 when sending a power request rather than a current request, which may reduce the effects of the wireless communications delay 625 on the overall wireless charging system 600.

In some embodiments, the base controller 620 may estimate the efficiency of the wireless charging system 600 and adjust the input power in response to the estimate. In some embodiments, for some period of time, this estimate of the efficiency may be made based on information known only at the wireless power transmitter system 649. For the period of time, the estimate and associated adjustments may be made irrespective of any information about actual measured power values at the receiver. As described more fully with respect to FIG. 7 below, a vehicle controller 775 may transmit a power request to a base controller 720 and the base controller 720 may adjust a voltage or current (e.g., AC or DC voltage/current from external power source 601, power factor correction unit 605, DC-LF AC voltage converter/inverter 610) to more closely match the requested level of charging power indicated in the power request based on the estimated efficiency of an efficiency estimator 630. This adjustment may allow for a more accurate supply of power to the vehicle battery 670 because it may account for possible losses, errors, or inefficiencies from the power requested from the vehicle controller 775 and the power received by the vehicle battery 670.

Figure 7:
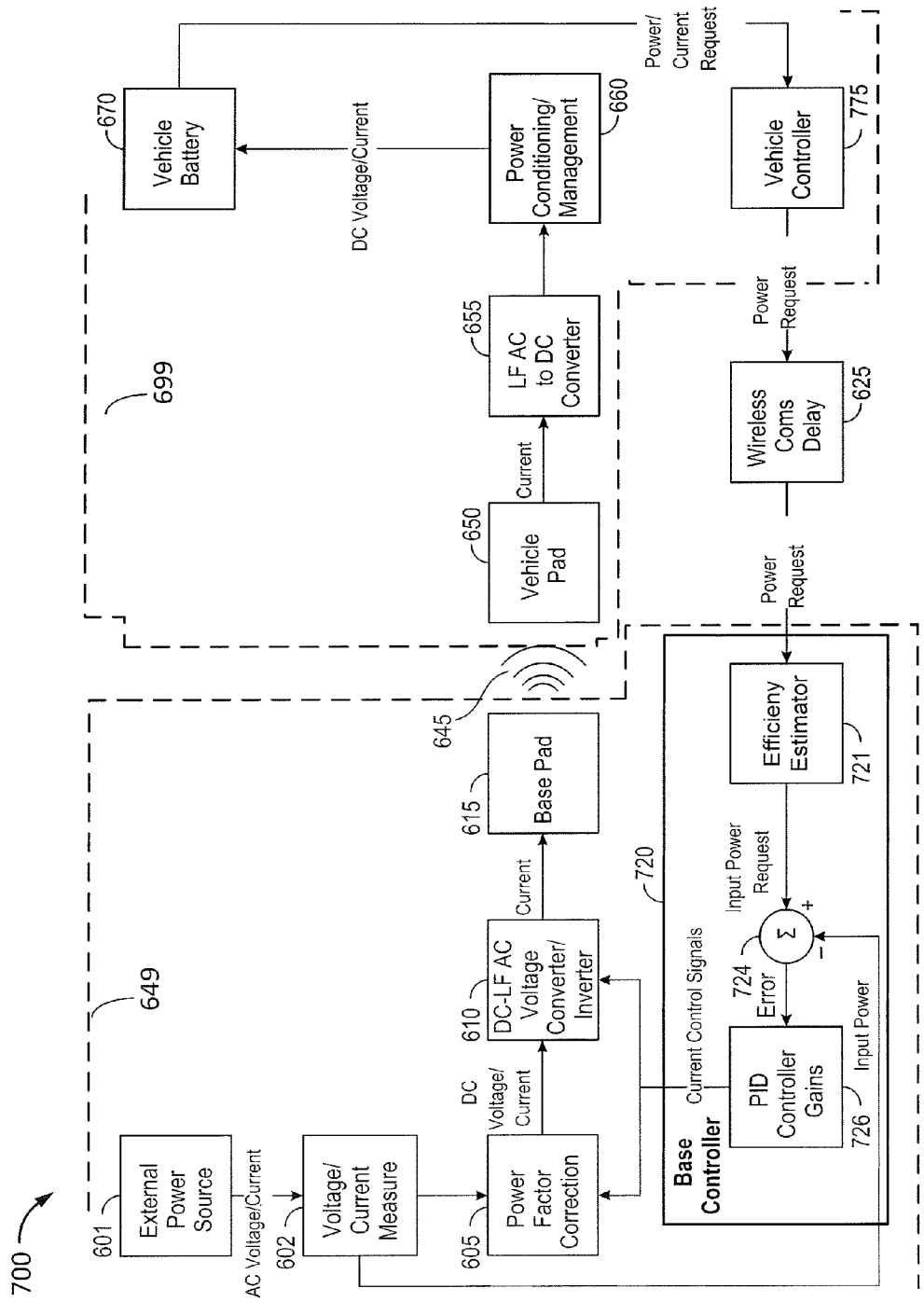
FIG. 7 is a functional block diagram of an exemplary communication and wireless power transfer between an electric vehicle and a base pad.

FIG. 7 depicts a functional block diagram of an exemplary wireless charging system 700 implementing a power request and an efficiency estimate. The wireless charging system 700 illustrated in FIG. 7 is similar to and adapted from the wireless charging system 600 illustrated in FIG. 6. Elements common to both share common reference indicia, and only differences between the systems 600 and 700 are described herein for the sake of brevity.

In addition to the elements of the wireless charging system 600, the wireless charging system 700 further comprises a voltage/current measure unit 602 connected to the external power source 601 and the power factor correction unit 605. The voltage/current measure unit 602 measures the DC voltage/current supplied by the external power source 601 to the power factor correction unit 605 and transmits the measured input power to a base controller 720. The base controller 720 comprises an efficiency estimator 721 connected to a comparator 724 which is connected a PID controller gains 726.

Similar to the wireless charging system 600, a vehicle controller 775 receives a power/current request from the vehicle battery 670. However, instead of transmitting a base current request that is adjusted based on an output power measurement at the receiver system 699, the vehicle controller 775 sends a power request to the base controller 720. The power request also experiences the wireless communication delay 625, however in at least certain embodiments the power request may be sent at a frequency less than sending the base current request as described above (or the power request may not change over time as much as the base current request as described above). The vehicle controller 775 sends the power request to the efficiency estimator 721 and the efficiency estimator 721 adjusts the power request by the estimated efficiency of the wireless charging system 700. In some embodiments, an initial estimated efficiency may be a pre-programmed value in a memory of the base controller 720 or available to the base controller 720 that is retrievable by the efficiency estimator 721. This estimated efficiency value (or power efficiency factor) may be determined based on known characteristics of the system when developed. In some embodiments, the estimated efficiency may be a value from a lookup table stored in a memory accessible by the base controller 720. In some aspects, the value from the lookup table may depend on the power request (e.g., the higher the power request, the higher the value in the lookup table). The efficiency estimator 721 may then send the adjusted power request to the comparator 724. The comparator 724 may compare the adjusted power request from the efficiency estimator 721 and the input power from the voltage/current measure unit 602. The comparator may then generate an error value based on the comparison and supply the error value to the PID controller gains 726. The PID controller gains 726 receives the error value and may attempt to minimize the error value of the comparator 724 by adjusting control outputs, e.g., adjusting the input power request from the efficiency estimator 721 to generate current control signals to send to the power factor correction unit 605 and the DC-LF AC voltage converter/inverter 610 so that they may adjust their systems to better match the adjusted input power request. In some embodiments, the power factor correction unit 605 and the DC-LF AC voltage converter/inverter 610 adjustments then adjust a current or voltage generator that delivers a current or voltage to the power antenna circuit of the base pad 615 to generate the magnetic field 645 to transfer power that may better meet the adjusted input power request. In some embodiments, the current or voltage generator of the power antenna circuit may comprise the external power source 601, the power factor correction unit 605, and/or the DC-LF AC voltage converter/inverter 610. As opposed to the wireless charging system 600 shown in FIG. 6, the wireless charging system 700 regulates input power based on the measured input power and based on a power efficiency factor from the efficiency estimator 721 which may allow the wireless power transmitter system 649 to react to changes in the measured power rather than relying on feedback from wireless power receiver system 699.

Figure 8:
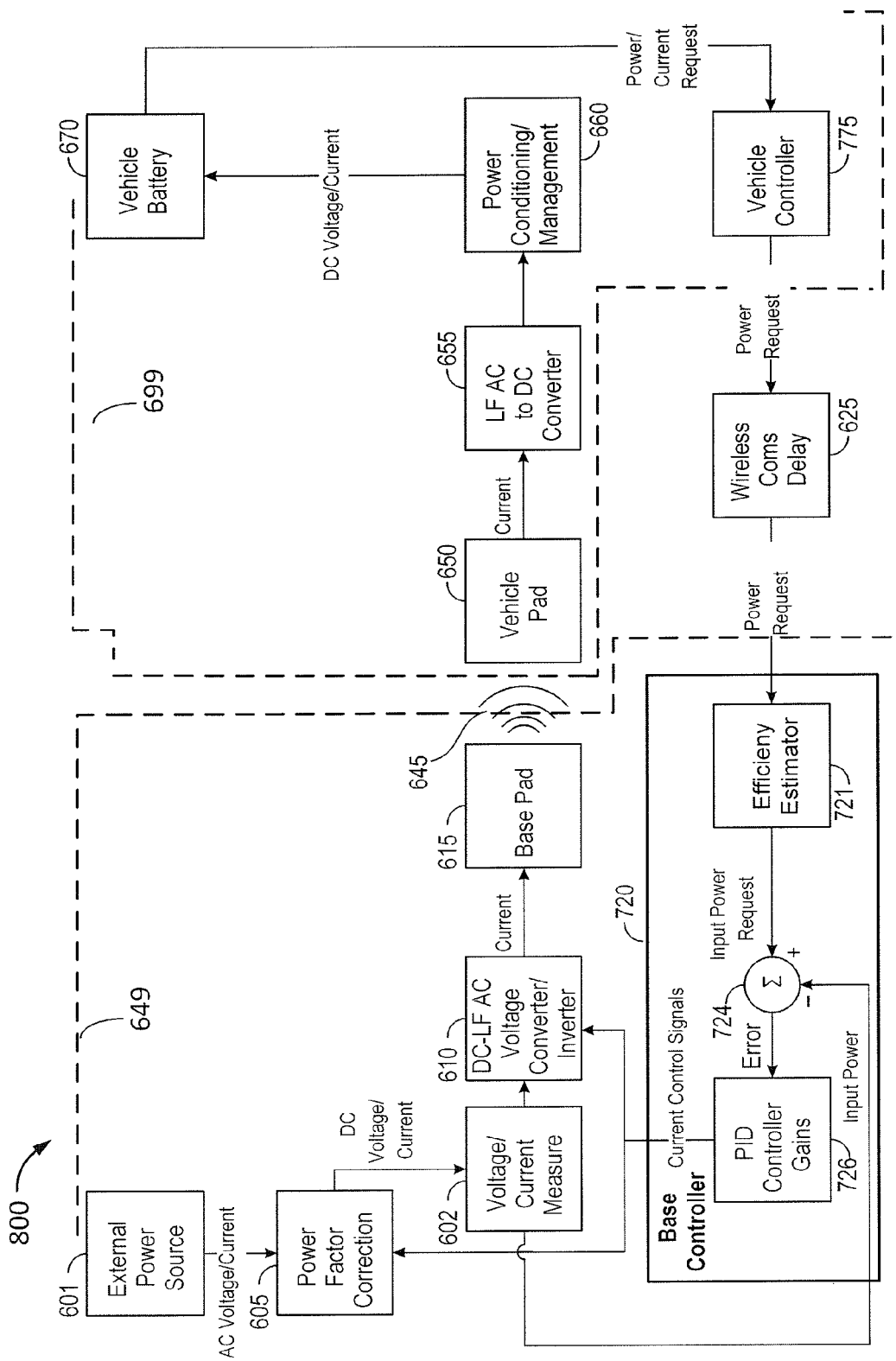
FIG. 8 is a functional block diagram of an exemplary communication and wireless power transfer between an electric vehicle and a base pad.

FIG. 8 depicts a functional block diagram of an exemplary wireless charging system 800 implementing a power request and an efficiency estimate. FIG. 8 depicts all of the same elements and functions as the wireless charging system 700 of FIG. 7, except for certain differences. FIG. 8 differs from FIG. 7 in that the voltage/current measure unit 602 is connected to the power factor correction unit 605 and the DC-LF AC voltage converter/inverter 610 and measures the input power provided from the power factor correction unit 605 to the DC-LF AC voltage converter/inverter 610 instead of being connected to the external power source 601 and the power factor correction unit 605 and measuring the power provided from the external power source 601 to the power factor correction unit 605. A non-limiting benefit of this configuration is that the input power measurement may be more accurate after the power factor correction unit 605 than the external power source 601 because the measurement may take into account any losses or inefficiencies of the power factor correction unit 605. In some embodiments, the voltage/current measure unit 602 may also be positioned to measure the input power provided from the DC-LF AC voltage converter/inverter 610 to the base pad 615 (not shown).

Figure 9:
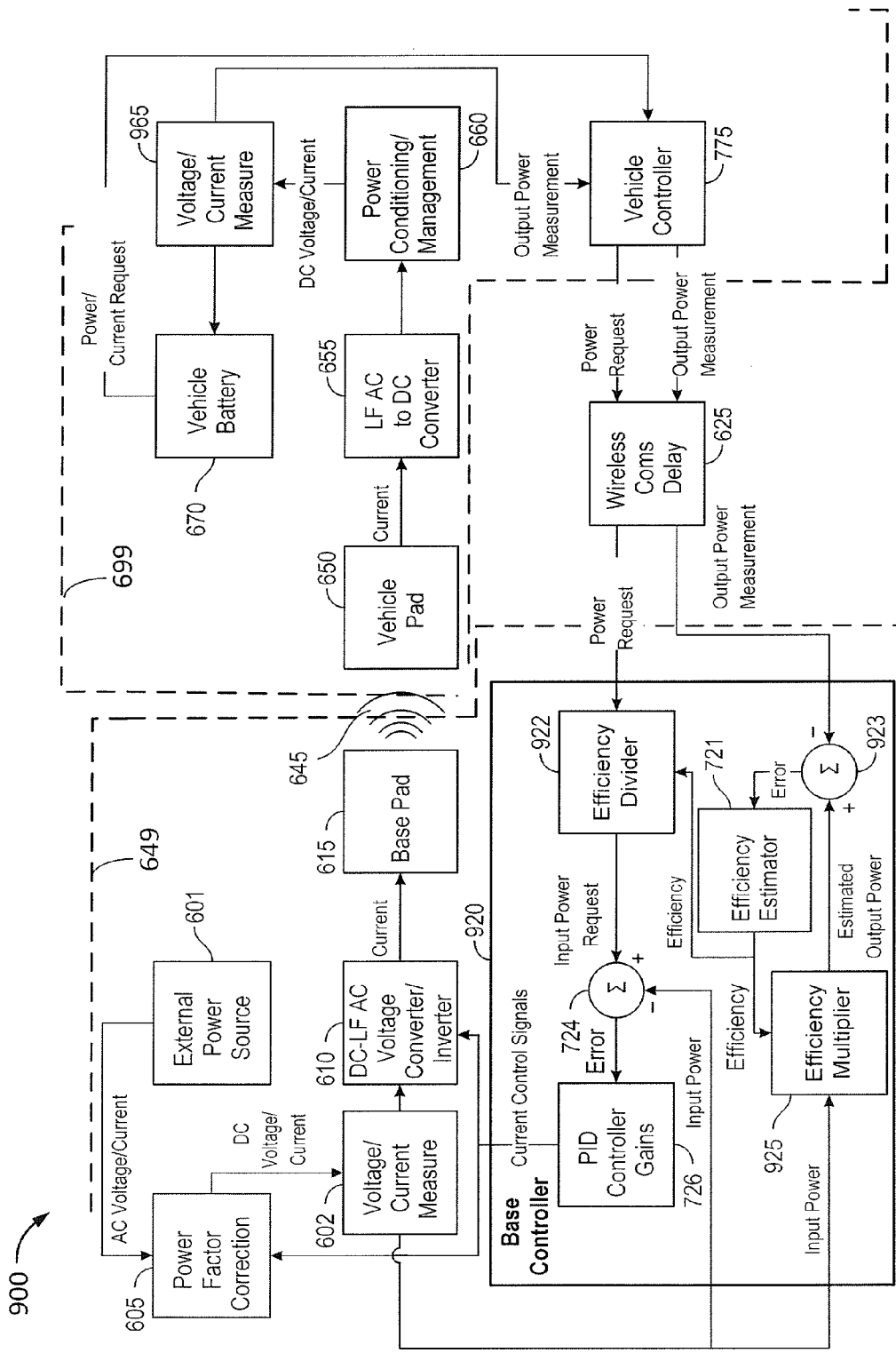
FIG. 9 is a functional block diagram of an exemplary communication and wireless power transfer between an electric vehicle and a base pad.

FIG. 9 depicts a functional block diagram of an exemplary wireless charging system 900. The wireless charging system 900 illustrated in FIG. 9 is similar to and adapted from the wireless charging system 800 illustrated in FIG. 8. Elements common to both share common reference indicia, and only differences between the systems 800 and 900 are described herein for the sake of brevity, as described above an efficiency estimate is used to adjust input power rather than relying on feedback from the wireless power receiver system 699 regarding actual measured values of electrical characteristics (e.g., output power) that are subject to the wireless communications delay 625. Certain further embodiments, however, may receive information at some frequency/periodicity from the wireless power receiver system 699 regarding actual measured power values to help improve the efficiency estimate (e.g., power efficiency factor) over time.

In FIG. 9, a voltage/current measure unit 965, connected to the power conditioning/management unit 660 and the vehicle battery 670, sends an output power measurement of the power delivered from power conditioning/management unit 660 to the vehicle battery 670 to the vehicle controller 775. The vehicle controller 775 receives the output power measurement and the power request from the vehicle battery 670 and sends the power request and the output power measurement to a base controller 920. The output power measurement and power request may experience the wireless communications delay 625.

The vehicle controller 775 sends the power request to an efficiency divider 922 of the base controller 920. The efficiency divider 922 is connected to the efficiency estimator 721 which sends an estimated efficiency of the wireless power transmitter system 649 to the efficiency divider 922. The efficiency divider 922 then divides the power request by the estimated efficiency and sends the resulting input power request to the comparator 724. As discussed with respect to FIGS. 7 and 8, the comparator 724 compares the input power request with the input power measured from the voltage/current measure unit 602 and sends the resulting error value to the PID controller gains 726. The PID controller gains 726 receives the error value and may attempt to minimize the error value by generating current control signals to send to the power factor correction unit 605 and the DC-LF AC voltage converter/inverter 610. In some embodiments, the power factor correction unit 605 and the DC-LF AC voltage converter/inverter 610 adjustments then adjust the current to the power antenna circuit of the base pad 615 to generate the magnetic field 645 to transfer power that may better meet the adjusted input power request.

The vehicle controller 775 sends the output power measurement to a comparator 923 of the base controller 920. In some embodiments, the vehicle controller 775 may send the output power measurement more frequently than the power request. The base controller 920 may receive the output power measurement at various intervals because the output power measurement transmission may experience the wireless communications delay 625. The comparator 923 is connected to an efficiency multiplier 925 and the efficiency estimator 721. The efficiency multiplier 925 is connected to the voltage/current measure unit 602, the efficiency estimator 721, and the comparator 923. The efficiency estimator 721 sends the estimated efficiency and the voltage/current measure unit 602 sends the input power to the efficiency multiplier 925. The efficiency multiplier 925 then multiplies the input power by the estimated efficiency and sends the resulting estimated output power to the comparator 923. The comparator 923 compares the output power measurement with the estimated output power and sends the resulting error value to the efficiency estimator 721. The efficiency estimator 721 then uses the error value to adjust its efficiency estimate. Sending the output power measurement may have several advantages. For example, as discussed above, the efficiency estimator 721 may use a pre-programmed efficiency estimate value. In this embodiment, the efficiency estimator 721 may use the output power measurement feedback to adjust its efficiency estimate to more accurately reflect the efficiency of power transferred from the base pad 615 to the vehicle battery 670. As the vehicle controller 775 sends more output power measurements, the efficiency estimator 721 may adjust the efficiency estimate with each new output power measurement received which may result in more accurate estimates.

Figure 10:
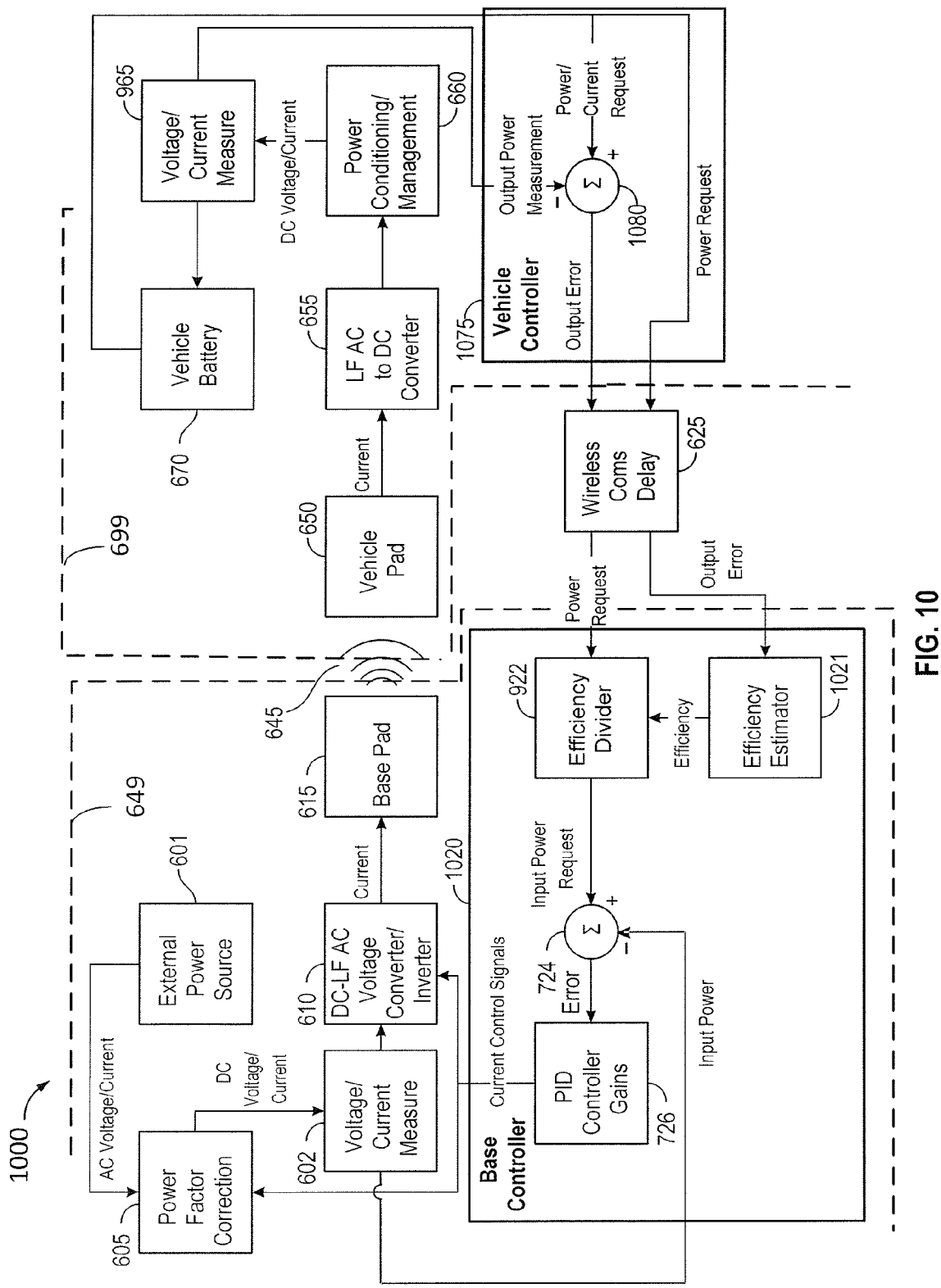
FIG. 10 is a functional block diagram of an exemplary communication and wireless power transfer between an electric vehicle and a base pad.

FIG. 10 depicts a functional block diagram of an exemplary wireless charging system 1000. The wireless charging system 1000 illustrated in FIG. 10 is similar to and adapted from the wireless charging system 900 illustrated in FIG. 9. Elements common to both share common reference indicia, and only differences between the systems 900 and 1000 are described herein for the sake of brevity.

In FIG. 10, the voltage/current measure unit 965, connected to the power conditioning/management unit 660 and the vehicle battery 670, sends the output power measurement to a vehicle controller 1075. The vehicle battery 670 sends a power/current request to the vehicle controller 1075. The vehicle controller 1075 comprises a comparator 1080 which compares the output power measurement and the power/current request. Instead of sending the output power measurement (e.g., as the vehicle controller 975), the vehicle controller 1075 sends the resulting output error to a base controller 1020. The vehicle controller 1075 also sends the power request to the base controller 1020. In some embodiments, the vehicle controller 975 may send the output error more frequently than the power request. Both the power request and the output error may experience the wireless communications delay 625. The base controller 1020 may receive the output error at various intervals because the output error transmission may experience the wireless communications delay 625.

The base controller 1020 may comprise an efficiency estimator 1021, which is connected to the efficiency divider 922. The efficiency estimator 1021 receives the output error from the vehicle controller 1075 and may adjust its efficiency estimate based on the error value. In some embodiments, the output error value may be a binary value which indicates that the efficiency estimator 1021 should either raise or lower the efficiency estimate without indicating how much to raise or lower the efficiency estimate. In some embodiments, the output error value may comprise multiple bits that may provide an error value which may indicate how much to raise or lower the efficiency estimate or may indicate to keep the efficiency estimate the same. Other possible error values are also possible. Sending an output error instead of the output power measurement may have several advantages. For example, sending the error value may be a more compressed transmission than sending the output power measurement which may reduce the transmission time from the vehicle controller 1075 to the base controller 1020 which in turn may reduce the effect of the wireless communications delay 625. Additionally, sending the error value may reduce the complexity and processing time of the base controller 1020 and may result in increased speed of delivering power based on the power request. In contrast to the wireless charging system 600 shown in FIG. 6, the wireless charging system 1000 regulates input power based on the measured input power, the power efficiency factor from the efficiency estimator 1021, and feedback received from the vehicle controller 1075. Because the wireless charging system 1000 can react to changes in the measured power and/or other electric characteristics of the wireless power transmitter system 649 rather than relying on feedback from wireless power receiver system 699, the effect of the wireless communications delay 625 becomes less significant. Accordingly, feedback received from the vehicle controller 1075 may occur less frequently or may be relied on less heavily as compared to the feedback provided by the vehicle controller 675 of FIG. 6.

Figure 11:
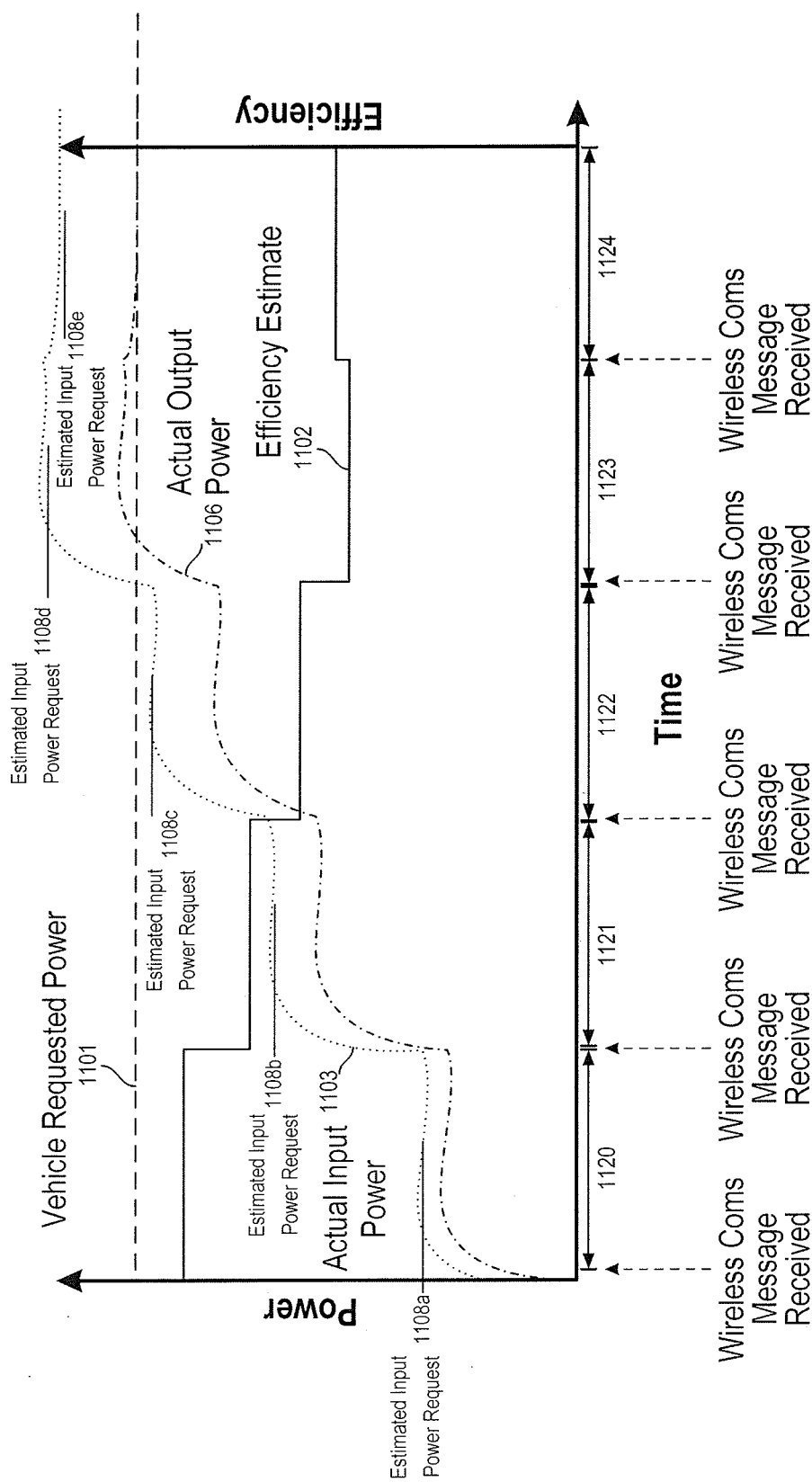
FIG. 11 is a time sequence diagram illustrating an exemplary communication and wireless power transfer between an electric vehicle and a base pad.

FIG. 11, in conjunction with FIGS. 4-10, is a time sequence diagram illustrating an exemplary communication and wireless power transfer between an electric vehicle 505 and a wireless power transmitter 649. In some embodiments, the exemplary communication and wireless power transfer illustrated in FIG. 11 may occur in the wireless charging systems 900 and 1000. In some embodiments, the exemplary communication and wireless power transfer illustrated in FIG. 11 may occur in a stationary wireless charging system. In the stationary wireless charging system, an electric vehicle 505 may be parked in a garage, parking space, parking garage, on the street, or other parking area with a wireless charging system comprising a base pad (e.g., similar to the base pad 515 or 615).

FIG. 11, includes a graph indicating a level of power on a left vertical axis, time on a horizontal axis, and a level of efficiency on a right vertical axis. Time increases from left to right and both power and efficiency increase from bottom to top. FIG. 11 comprises a level dashed horizontal line extending from the top left portion of the graph to the top right portion of the graph. The dashed horizontal line represents a vehicle requested power level 1101. The vehicle requested power level 1101 may be similar to the power request in FIGS. 7-10. FIG. 11 also comprises a solid horizontal line extending from left to right at multiple efficiency levels. The solid horizontal line represents an efficiency estimate level 1102 of the wireless power transmitter 649. The efficiency estimate level 1102 may be similar to the efficiency estimate in FIGS. 7-10. FIG. 11 also comprises a dotted horizontal curve extending from left to right and generally increasing in power from left to right. The dotted horizontal curve represents an actual input power curve 1103 of the wireless power transmitter 649. The actual input power curve 1103 may be similar to the input power measured by the voltage/current measurement unit 602 (FIGS. 9-10). FIG. 11 also comprises a dashed horizontal curve extending from left to right and generally increasing in power from left to right. The dashed horizontal curve represents an actual output power curve 1106 of the wireless power transmitter 649. The actual output power curve 1106 may be similar to the output power measurement measured by the voltage/current measurement unit 965. FIG. 11 also comprises various points along the actual input power curve 1103 which may represent an estimated input power request 1108. The estimated input power request 1108 may be similar to the input power request sent from the efficiency estimator 721 or the efficiency divider 922 in FIGS. 7-10.

FIG. 11 illustrates the wireless power transmitter 649 responding to the vehicle power request level 1101 over time. At the beginning of time 1120, the vehicle controller 975 or 1075 may send the vehicle requested power level 1101 and the output error to the base controller 920 or 1020. During time 1120, the base controller 920 or 1020 may then calculate the estimated input power request 1108a and communicate control signals to the power factor correction unit 605 and DC-LF AC voltage converter/inverter 610 so that the current in the base pad 615 may provide the power represented by the actual input power curve 1103.

As shown, the efficiency estimate level 1102 during time 1120 is relatively close to the vehicle requested power level 1101, indicating a high efficiency estimate level 1102. In some embodiments, the efficiency estimate level 1102 may be a higher or lower value. At the beginning of time 1121, the base controller 920 or 1020 receives another wireless communication from the vehicle controller 975 or 1075 which indicates the output power measurement (e.g., actual output power curve 1106) or the output error value. The base controller 920 or 1020 can then calculate a new estimated input power request 1108b based on the received output power measurement or output error value. As shown, the received output power measurement or output error value may indicate that the efficiency estimator 921 or 1021 should reduce the efficiency estimate level 1102, which in turn increases the estimated input power request 1108b, the actual input power curve 1103, and the actual output power curve 1106. At the beginning of time 1122, the base controller 920 or 1020 receives another wireless communication from the vehicle controller 975 or 1075 which indicates the output power measurement (e.g., actual output power curve 1106) or the output error value. As shown, the received output power measurement or output error value again indicates that the efficiency estimator 921 or 1021 should reduce the efficiency estimate level 1102, which in turn increases the estimated input power request 1108c, the actual input power curve 1103, and the actual output power curve 1106. At the beginning of time 1123, the base controller 920 or 1020 receives another wireless communication from the vehicle controller 975 or 1075 which indicates the output power measurement (e.g., actual output power curve 1106) or the output error value. As shown, the received output power measurement or output error value again indicates that the efficiency estimator 921 or 1021 should reduce the efficiency estimate level 1102, which in turn increases the estimated input power request 1108d, the actual input power curve 1103, and the actual output power curve 1106. At the beginning of time 1124, the base controller 920 or 1020 receives another wireless communication from the vehicle controller 975 or 1075 which indicates the output power measurement (e.g., actual output power curve 1106) or the output error value. As shown, the received output power measurement or output error value now indicates that the efficiency estimator 921 or 1021 should increase the efficiency estimate level 1102, because the actual output power curve 1106 now exceeds the vehicle requested power level 1101. The increased efficiency estimate level 1102 thus decreases the estimated input power request 1108e, the actual input power curve 1103, and the actual output power curve 1106.

Figure 12:
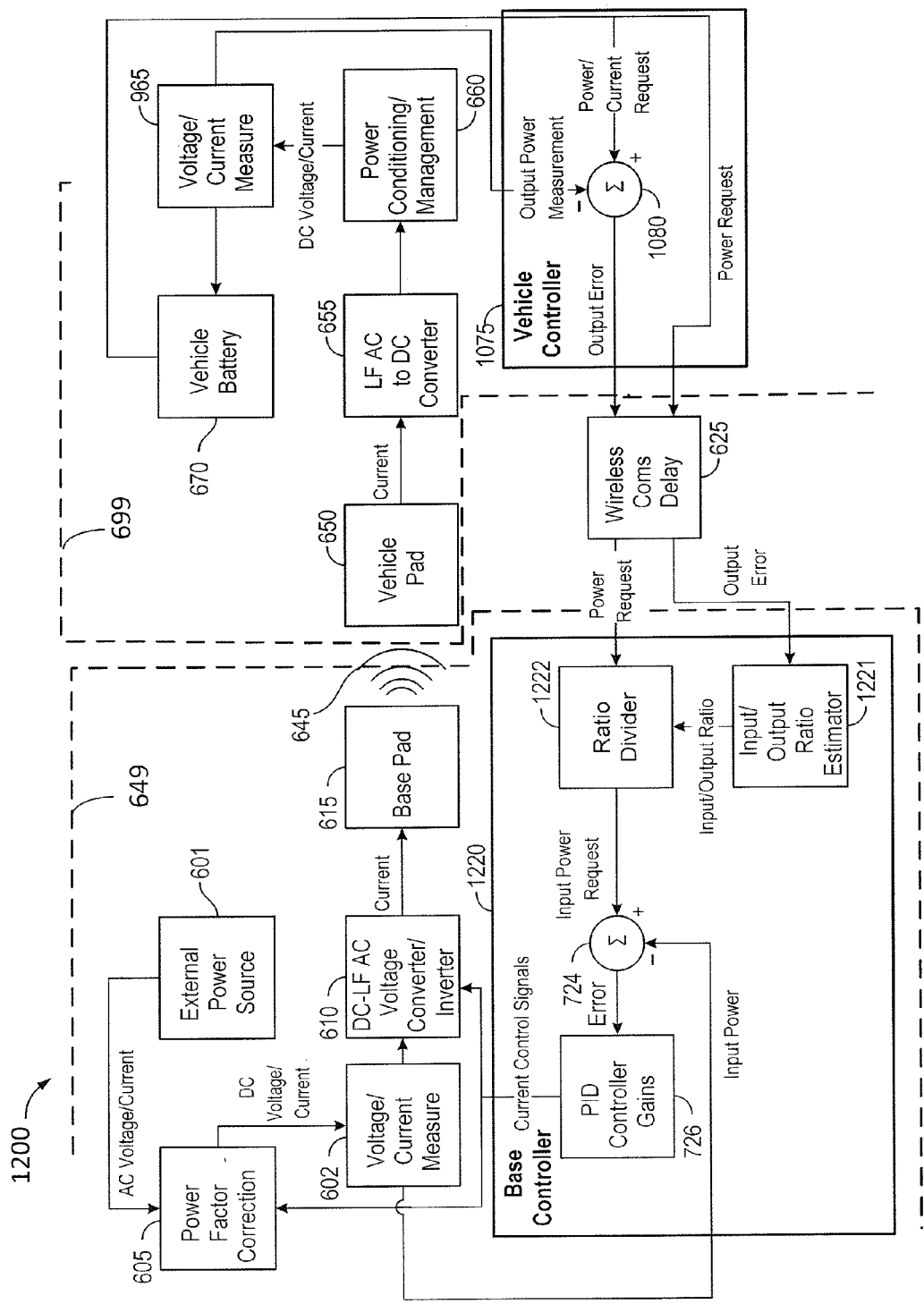
FIG. 12 is a functional block diagram of an exemplary communication and wireless power transfer between an electric vehicle and a base pad.

FIG. 12 depicts a functional block diagram of an exemplary wireless charging system 1200. The wireless charging system 1200 illustrated in FIG. 12 is similar to and adapted from the wireless charging system 1000 illustrated in FIG. 10. Elements common to both share common reference indicia, and only differences between the systems 1000 and 1200 are described herein for the sake of brevity.

In FIG. 12, the vehicle controller 1075 sends the output error and the power request that may experience the wireless communications delay 625 to a base controller 1220. In some embodiments, the vehicle controller 1075 may send the output error more frequently than the power request. The base controller 1220 may receive the output error at various intervals because the output error transmission may experience the wireless communications delay 625. The base controller 1220 comprises an input/output ratio estimator 1221 which is connected to a ratio divider 1222. The input/output ratio estimator 1221 receives the output error from the vehicle controller 1075 and may calculate an estimated input/output ratio of the input and output power based on the received output error. The input/output ratio estimator 1221 then sends the ratio divider 1222 the estimated input/output ratio. The ratio divider 1222 divides the power request by the input/output ratio to generate the input power request to send to the comparator 724.

The wireless charging system 1200 may offer several advantages in dynamic wireless charging systems such as the dynamic wireless charging systems 500 and 550. With reference to FIG. 5B, as the electric vehicle 505 travels over the base pads 515*a-d*, there may be spaces in between the pads where the electric vehicle may receive little to no power from the base pads 515*a-d*. Therefore base pads 515*a-d* may not deliver a constant power to the electric vehicle 505 because of the gaps in between the base pads 515*a-d* and the base controller 1220 may use an average power of the base pads 515*a-d* to determine the correct input power to supply. The base controller 1220 therefore uses the input/output ratio to adjust the level of charging power provided so that it may account for the average power of the base pads 515, as well as the efficiency, to more closely match the requested level of charging power indicated in the power request.

Figure 13:
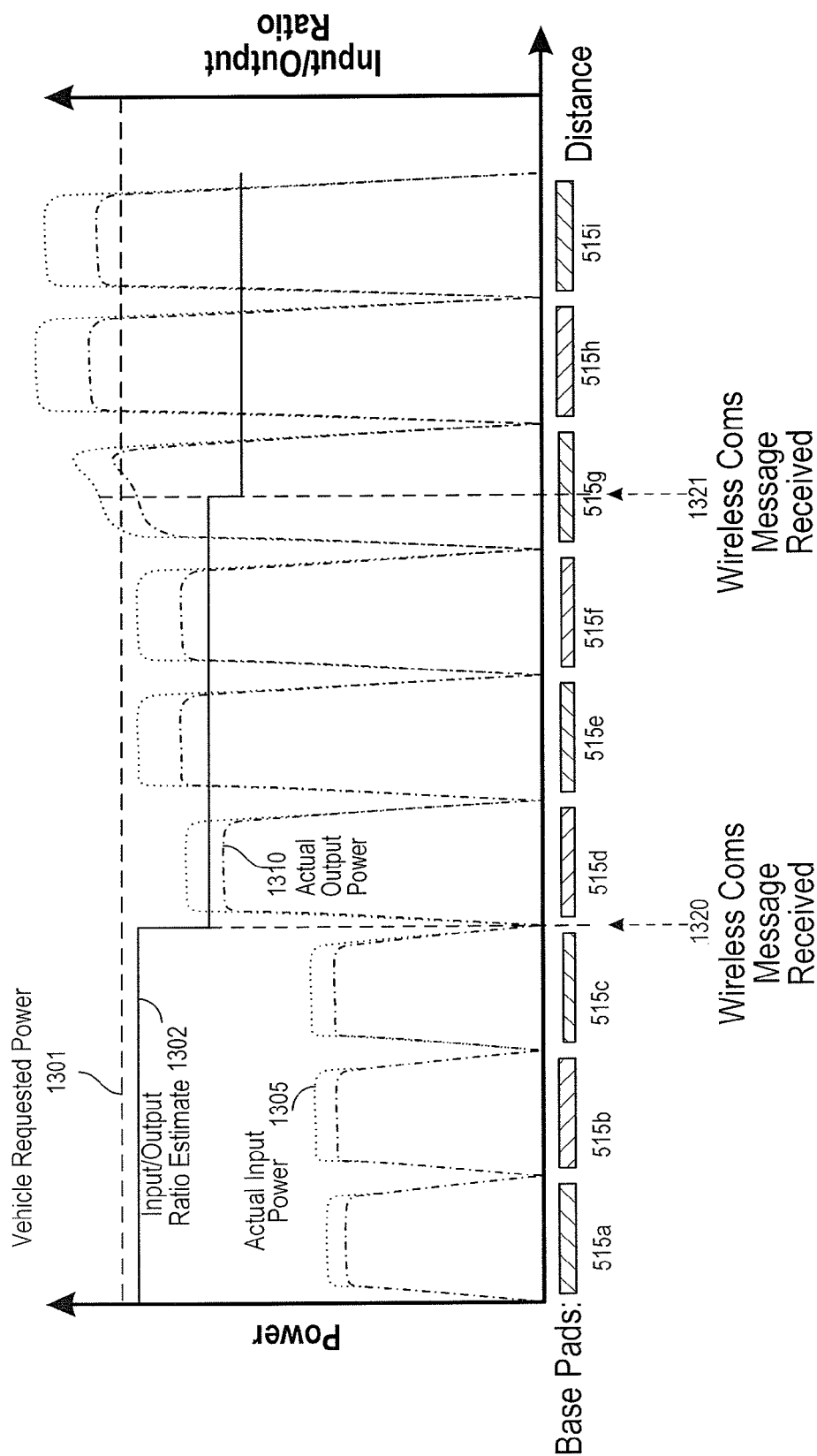
FIG. 13 is a diagram illustrating an exemplary communication and wireless power transfer between an electric vehicle and a base pad.

FIG. 13, is a graph illustrating the average power supplied during an exemplary communication and wireless power transfer in a dynamic wireless charging system. In some embodiments, the exemplary communication and wireless power transfer illustrated in FIG. 11 may occur in the dynamic wireless charging systems 500, 550 and the wireless charging system 1200.

FIG. 13 includes a left vertical axis indicating a level of power, a horizontal axis representing a distance traveled, and a right vertical axis indicating an input/output ratio level. FIG. 13 comprises a level dashed horizontal line extending from the top left portion of the graph to the top right portion of the graph. The dashed horizontal line represents a vehicle requested power level 1301. The vehicle requested power level 1301 may be similar to the power request in FIGS. 7-10 and 12. FIG. 13 also comprises a solid horizontal line extending from left to right at multiple input/output ratio levels. The solid horizontal line represents an input/output ratio level 1302 of the wireless power transmitter 649. The input/output ratio level 1302 may be similar to the input/output ratio in FIG. 12. FIG. 13 also comprises a dotted horizontal curve extending from left to right and generally increasing in power from left to right. The dotted horizontal curve represents an actual input power curve 1305 of the wireless power transmitter 649 as an electric vehicle 505 travels past a base pad 515. The actual input power curve 1305 may be similar to the input power measured by the voltage/current measurement unit 602. As shown, actual input power curve 1305 significantly decreases in between the base pads 515. FIG. 13 also comprises a dashed horizontal curve extending from left to right and generally increasing in power from left to right. The dashed horizontal curve represents an actual output power curve 1310 of the wireless power transmitter 649. The actual output power curve 1310 may be similar to the output power measurement measured by the voltage/current measurement unit 965. As shown, actual output power curve 1310 significantly decreases in between the base pads 515.

FIG. 13 illustrates the wireless power transmitter 649 responding to the vehicle power request level 1302 as the electric vehicle 505 travels over base pads 515. Before the electric vehicle 505 passes over the base pads 515*a-c*, the vehicle controller 1075 may send the vehicle requested power 1302 and the output error to the base controller 1220. The base controller 1220 may then adjust the input power based on the input/output ratio estimate level 1302 to more closely match the vehicle power request level 1302 and communicate control signals to the power factor correction unit 605 and DC-LF AC voltage converter/inverter 610 so that the base pads 515*a-c* may provide the actual input power curve 1305.

As shown, the input/output ratio estimate level 1302 begins relatively close to the vehicle requested power level 1301 while the electric vehicle travels over base pads 515*a-c*, indicating a high input/output ratio estimate level 1302. In some embodiments, the input/output ratio estimate level 1302 may be a higher or lower value. At point 1320, the base controller 1220 receives another wireless communication from the vehicle controller 1075 which indicates the output error value. The input/output ratio estimator 1221 can then calculate a new estimated input power request based on the received output error value. As shown, the output error value may indicate that the input/output ratio estimator 1221 should reduce the input/output ratio estimate level 1302, which in turn increases the actual input power curve 1305 and the actual output power curve 1310. At point 1321, the base controller 1220 receives another wireless communication from the vehicle controller 1075 which indicates the output error value. The input/output ratio estimator 1221 can then calculate a new estimated input power request based on the received output error value. As shown, the output error value may indicate that the input/output ratio estimator 1221 should reduce the input/output ratio estimate 1302, which in turn increases the actual input power curve 1305 and the actual output power curve 1310. As shown, the base pad 515*g* may adjust its input power, represented by the actual input power curve 1305 while the electric vehicle 505 is positioned over the base pad 515*g* and when the base controller 1220 receives a wireless communication message from the vehicle controller 1075. Additionally, while the base pads 515*g-i* may provide the power represented by the actual output power curve 1310 above vehicle requested power level 1301, the average power provided by the base pads 515*g-i* may be below the vehicle requested power level 1301 because the actual input power curve 1305 decreases substantially between the base pads 515*g-i*.

In one embodiment, the vehicle controller 1075 of the electric vehicle 505 may not be able to send its updated output error values or output power measurements frequently enough to capture certain changes of the wireless charging system 1200 due to the wireless communications delay 625. In some embodiments, the base controller (e.g., base controller 1020 or 1220) may observe certain electrical characteristics (e.g., current, impedance, voltage, resistance, inductance, resonant frequency, phase, etc.) of the wireless charging system 1200 for any changes that occur over time (e.g., time period 1120 in FIG. 11 or a time period between points 1320 and 1321 in FIG. 13) and may unilaterally adjust the input power (e.g., power from the external power source 601, power factor correction unit 605 or the DC-LF AC voltage converter/inverter 610) to account for such changes. For example, the base controller may observe a change in the current driven to a transmit coil of the base pad 615. Such a change may be the result of the base pad 615 and the vehicle pad 650 moving closer (e.g., when a person enters the vehicle) or farther away (e.g., when the person exits the vehicle), an object located in between the base pad 615 and vehicle pad 650, or some other change to the wireless charging system 1200. The base controller 1220 will send control signals to adjust the power accordingly to account for such changes based on the previously received power request (e.g., vehicle requested power 1301) and the previously calculated or programmed efficiency estimate (e.g., from efficiency estimator 1021) or input/output ratio estimate (e.g., from input/output ratio estimator 1221).

Figure 14:
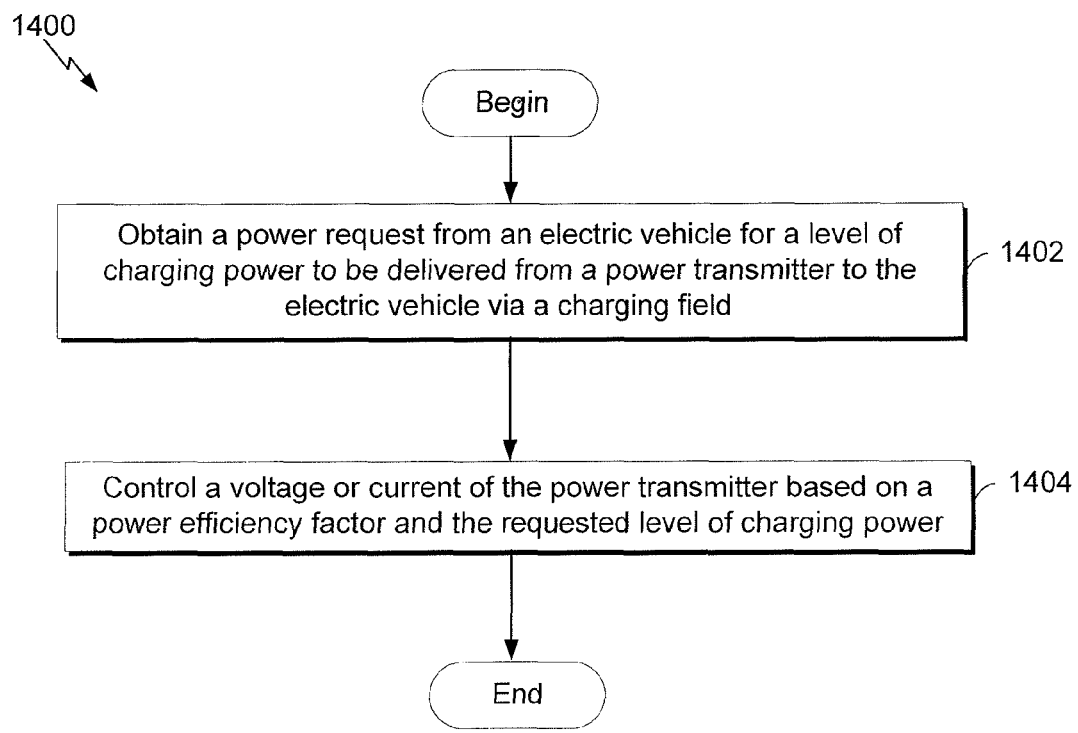
FIG. 14 depicts a flowchart of an exemplary method of charging an electric vehicle according to one embodiment of the wireless charging system.

FIG. 14 depicts a flowchart of an exemplary method of charging an electric vehicle 505 according to the wireless charging system. The method shown in FIG. 14 may be implemented via one or more devices in a base controller substantially similar to the base controller 720, 920, 1020, or 1220 of FIGS. 7-10 and 12 of a charging system including the base pad 515 or 615 of FIGS. 5-10 and 12. In one embodiment, once the electric vehicle 505 (FIGS. 5A and 5B) approaches the charging system, the electric vehicle 505 may initiate communication with the base controller (FIGS. 5A and 5B) through a communication channel for example, to request a level of power from the base pad. Once the electric vehicle 505 transmits the power request, the charging process can be initiated, and the base controller proceeds to block 1402.

At block 1402, the base controller obtains a power request from an electric vehicle for a level of charging power to be delivered from a power transmitter to the electric vehicle via a charging field. The electric vehicle may comprise the electric vehicle 505. A vehicle controller 775 or 1075 (FIGS. 7-10 and 12) of the electric vehicle 505 may transmit the power request to the base controller. The base controller may obtain the power request via a communication channel 219 (FIG. 2). Once the base controller obtains the power request, the base controller proceeds to block 1404.

At block 1404, the base controller controls a voltage or current of the power transmitter based on a power efficiency factor and the requested level of charging. The base controller may comprise an efficiency estimator 721 and 1021 (FIGS. 7-10) that estimates the efficiency of the wireless charging system (e.g., wireless charging systems 600, 700, 800, 900, 1000, and 1200. In some embodiments, the PID controller gains 726 may transmit current control signals indicating a determined current sufficient to provide power at the requested level based on the estimated efficiency to the power factor correction unit 605 and the DC-LF AC voltage converter/inverter 610. The power factor correction unit 605 and the DC-LF AC voltage converter/inverter 610 then adjust their outputs and the DC-LF AC voltage converter/inverter 610 provides the determined current to the base pad. The base pad may then provide power to the wireless power receiver based on the determined current. After the base controller controls the voltage or current of the power transmitter based on a power efficiency factor and the requested level of charging, the method ends until the base controller obtains a new power request from the electric vehicle.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, means for obtaining a request from the electric vehicle for a level of charging power to be delivered from a power antenna circuit to the electric vehicle via a charging field may comprise a communication antenna or the base controller 720, 920, 1020, and 1220. Additionally, means for controlling a current or a voltage of the power antenna circuit based on a power efficiency factor and the requested level of charging power may comprise the base controller 720, 920, 1020, and 1220.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wirelessly charging an electric vehicle, comprising:
    a communication receiver configured to obtain a request for a level of charging power, wherein the request indicates a level of charging power to be delivered from a power antenna circuit to the electric vehicle via a charging field; and
    a controller operationally coupled to the communication receiver and configured to control a current or voltage generator of the power antenna circuit based on a power efficiency factor and the requested level of charging power, wherein the power efficiency factor during a first time period is determined without receiving an amount of power measurement at the electric vehicle during the first time period.

2. The apparatus of claim 1, wherein the power efficiency factor is based at least in part on a pre-programmed value retrievable by the controller.

3. The apparatus of claim 2, wherein the pre-programmed value comprises a value of a lookup table comprising different pre-programmed values for different charging power levels.

4. The apparatus of claim 1, wherein the power efficiency factor comprises a determination of an efficiency of at least the power delivered by the power antenna circuit to a receive antenna and a rectifier circuit of the electric vehicle.

5. The apparatus of claim 1, further comprising a sensor configured to measure a current or voltage of the power antenna circuit.

6. The apparatus of claim 5, wherein the controller is further configured to adjust the power efficiency factor based on the measured current or voltage of the power antenna circuit.

7. The apparatus of claim 1, wherein the communication receiver is further configured to receive an output power measurement or an output error value from the electric vehicle.

8. The apparatus of claim 7, wherein the controller is further configured to adjust the power efficiency factor based on the output power measurement or the output error value.

9. The apparatus of claim 7, wherein the controller is further configured to control the current or voltage generator based on the power efficiency factor during a first time period, and wherein the output power measurement is received after the first time period.

10. The apparatus of claim 7, wherein the output error value comprises a difference between the output power measurement of the electric vehicle and the requested level of charging power, and wherein the output power measurement comprises a measurement of a level of charging power delivered to a load of the electric vehicle from the power antenna circuit.

11. The apparatus of claim 7, wherein the controller is further configured to control the current or voltage generator of the power antenna circuit based on a ratio of an input power of the power antenna circuit and the output power measurement.

12. The apparatus of claim 11, wherein an initial value of the ratio comprises a pre-programmed value retrievable by the controller.

13. The apparatus of claim 11, wherein the controller is further configured to adjust the ratio based on the output power measurement or the output error value.

14. The apparatus of claim 1, wherein the controller is further configured to control the current or voltage generator of the power antenna circuit based on a change in an electrical characteristic of the power antenna circuit or a receive circuit of the electric vehicle.

15. The apparatus of claim 14, wherein the electrical characteristic comprises at least one of a current, or an impedance, or a voltage, or a resistance, or a inductance, or resonant frequency, or a phase, or any combination thereof.

16. A method for wirelessly charging an electric vehicle, comprising:
    obtaining a request from the electric vehicle for a level of charging power, wherein the request indicates a level of charging power to be delivered from a power transmitter to the electric vehicle via a charging field; and
    controlling a current or voltage of the power transmitter based on a power efficiency factor and the requested level of charging power, wherein the power efficiency factor during a first time period is determined without receiving an amount of power measurement at the electric vehicle during the first time period.

17. The method of claim 16, wherein the power efficiency factor is based at least in part on a pre-programmed value retrievable by the controller.

18. The method of claim 16, wherein the power efficiency factor comprises a determination of an efficiency of at least the power delivered by the power antenna circuit to a receive antenna and a rectifier circuit of the electric vehicle.

19. The method of claim 16, further comprising adjusting the power efficiency factor based on a measured current or voltage of the power transmitter.

20. The method of claim 16, further comprising receiving an output power measurement or an output error value from the electric vehicle.

21. The method of claim 20, further comprising adjusting the power efficiency factor based on the output power measurement or the output error value.

22. The method of claim 20, wherein controlling a current or voltage of the power transmitter comprises controlling a current or voltage of the power transmitter based on a ratio of an input power of the power antenna circuit and the output power measurement.

23. The method of claim 22, wherein controlling a current or voltage of the power transmitter comprises controlling a current or voltage of the power transmitter based on the output power measurement or the output error value.

24. The method of claim 16, wherein controlling a current or voltage of the power transmitter comprises controlling a current or voltage of the power transmitter based on a change in an electrical characteristic of the power transmitter or the electric vehicle.

25. The method of claim 24, wherein the electrical characteristic comprises at least one of a current, or an impedance, or a voltage, or a resistance, or a inductance, or resonant frequency, or a phase, or any combination thereof.

26. An apparatus for wirelessly charging an electric vehicle, comprising:
   means for obtaining a request from the electric vehicle for a level of charging power, wherein the request indicates a level of charging power to be delivered from a power antenna circuit to the electric vehicle via a charging field; and
   means for controlling a current or a voltage of the power antenna circuit based on a power efficiency factor and the requested level of charging power, wherein the power efficiency factor during a first time period is determined without receiving an amount of power measurement at the electric vehicle during the first time period.

27. The apparatus of claim 26, wherein the obtaining means comprises a receiver, wherein the controlling means comprises a controller.

28. The apparatus of claim 26, further comprising adjusting the power efficiency factor based on a measured current or voltage of the power antenna circuit.

29. The apparatus of claim 26, further comprising:
   means for receiving an output power measurement or an output error value from the electric vehicle; and
   means for adjusting the power efficiency factor based on the output power measurement or the output error value.

* * * * *